United States Patent [19]

Okamura et al.

[11] Patent Number: 4,507,986
[45] Date of Patent: Apr. 2, 1985

[54] CONTROL SYSTEM FOR MOTOR VEHICLE

[75] Inventors: Kenji Okamura, Yokosuka; Hatsuo Nagaishi, Zushi; Tsuyoshi Kitahara, Yokohama; Kohki Sone, Tokyo; Koyo Nakamura, Yokosuka, all of Japan

[73] Assignee: Nissan Motor Company, Limited, Yokohama, Japan

[21] Appl. No.: 351,266

[22] Filed: Feb. 22, 1982

[30] Foreign Application Priority Data

Feb. 24, 1981 [JP] Japan ................... 56-24968

[51] Int. Cl.³ .................. B60K 41/18; B60K 41/12
[52] U.S. Cl. ......................... 74/866; 74/860; 74/859
[58] Field of Search ................ 74/856, 857, 859, 860, 74/865, 866; 364/424.1

[56] References Cited

U.S. PATENT DOCUMENTS

| | | | |
|---|---|---|---|
| 3,052,132 | 9/1962 | Dittrich et al. | 474/18 |
| 3,927,528 | 12/1975 | Van der Kolk et al. | 60/431 |
| 4,107,776 | 8/1978 | Beale | 74/866 |
| 4,281,567 | 8/1981 | Maurer | 74/866 |
| 4,291,594 | 9/1981 | Baudoin | 74/859 |
| 4,353,272 | 10/1982 | Schneider et al. | 74/857 |
| 4,381,684 | 5/1983 | Himmelstein | 74/857 |
| 4,401,073 | 8/1983 | Furuashi | 74/860 |

FOREIGN PATENT DOCUMENTS

| | | | |
|---|---|---|---|
| 0038083 | 10/1981 | European Pat. Off. | 74/866 |
| 0044202 | 1/1982 | European Pat. Off. | |
| 2410342 | 3/1975 | Fed. Rep. of Germany | 74/856 |
| 2241007 | 3/1975 | France | |
| 2345307 | 3/1977 | France | |
| WO82/01519 | 5/1982 | PCT Int'l Appl. | |
| 1556888 | 2/1977 | United Kingdom | |
| 2057605 | 4/1981 | United Kingdom | |
| 2057606 | 4/1981 | United Kingdom | 74/865 |
| 2061424 | 5/1981 | United Kingdom | 74/857 |

Primary Examiner—Allan D. Herrmann
Assistant Examiner—Dirk Wright
Attorney, Agent, or Firm—Schwartz, Jeffery, Schwaab, Mack, Blumenthal & Koch

[57] ABSTRACT

A control system for a motor vehicle is disclosed wherein the parameters for optimum operation for an engine are determined based upon an acceleration position and a vehicle speed, and a continuously variable transmission is operated to vary a drive ratio in such a manner as to cause the engine to operate according to those parameters.

11 Claims, 38 Drawing Figures

| | | SW1 | | SW2 | |
|---|---|---|---|---|---|
| | | A | B | C | D |
| REVERSE (STEP UP) ↑ ↓ FORWARD (STEP DOWN) | 1 | ON | | ON | |
| | 2 | | ON | ON | |
| | 3 | | ON | | ON |
| | 4 | ON | | | ON |
| | 1 | ON | | ON | |

FIG.16B   FIG.16C
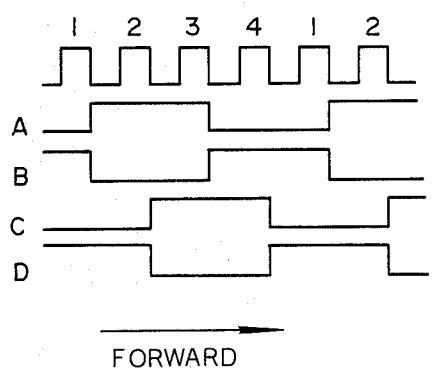
FORWARD
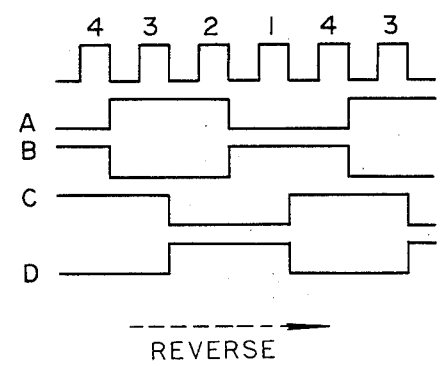
REVERSE

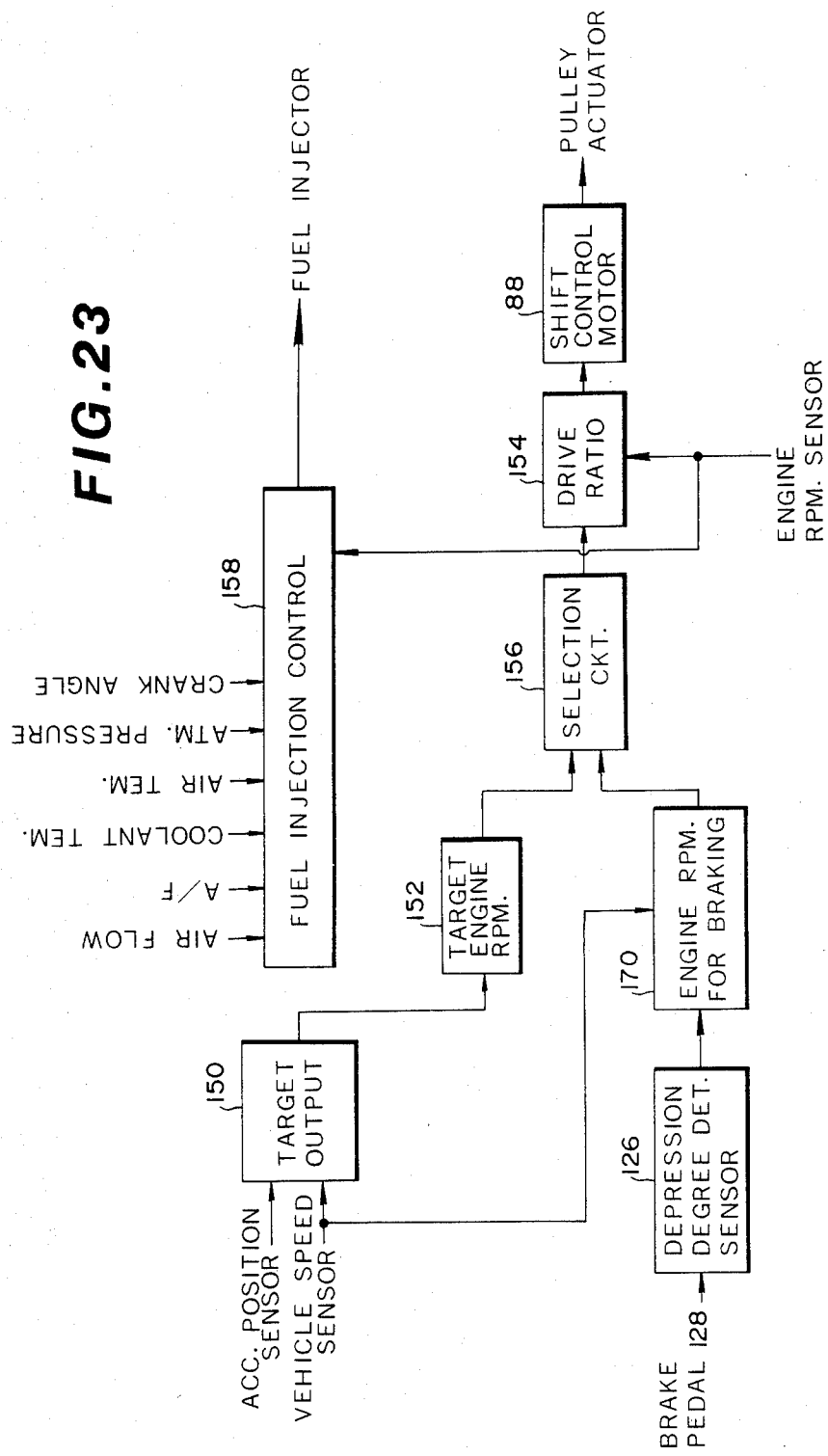

CONTROL SYSTEM FOR MOTOR VEHICLE

BACKGROUND OF THE INVENTION

1. Field of the Invention

The present invention relates to a control system for a motor vehicle, and more particularly to a control system for a motor vehicle having an internal combustion engine and a continuously variable transmission wherein the engine is operated along a predetermined operation line expressed in terms of at least two operating parameters for the vehicle.

2. Description of the Prior Art

Conventionally, it is a driver that controls a throttle position of the throttle valve of an internal combustion engine and a gear ratio of a transmission by depressing an accelerator pedal and manipulating a shift lever in view of an operation state of a motor vehicle so as to operate the motor vehicle for crusing or acceleration or deceleration or hill climbing. In this system, the driver has to adjust the position of the throttle valve and gear ratio to meet an ever-changing demand on the motor vehicle expressed by a changes in engine RPM. and in load. Thus, it is the conventional practice to design a control characteristic of the engine such that a shaft torque increases with increasing the opening degree of the throttle valve at any given engine RPM. Accordingly, the driver must cover all of the shaft torque range below a full throttle valve characteristic curve of the engine as shown in a graph of FIG. 1. (A family of dotted line curves in the Figure show isofuel consumption lines.)

The conventional system explained above has an inherent drawback that it is difficult to operate the engine in the most efficient operation state, viz., an operation line which may be expressed by the most efficient engine RPM. and a shaft torque for any given engine output.

As shown in FIG. 1, good engine thermal efficiency (fuel economy performance) is obtained when the engine is operated within an operation range wherein the engine RPM. is relatively low and the shaft torque is relatively high. The engine must be operated at or near the full throttle position to obtain good thermal efficiency. The reason is that if the opening degree of the throttle valve is small, the resistance to the induction increases, resulting in an increase in a pumping loss to cause a reduction in the thermal efficiency of the engine. With the conventional system, opening the throttle valve by a small degree from an operation state wherein the engine RPM. is low results in an increase in shaft torque. If, now, in order to increase the vehicle speed, the accelerator pedal is fully depressed to open the throttle valve to its fully opened position, engine RPM. no longer remains in the low engine RPM. range and increases to a value high enough to produce a shaft torque high enough to accelerate the vehicle. Therefore, a high shaft torque is not produced at low engine RPM., unless another operation parameter like a shift position is changed to a small gear ratio, such as by selecting a third gear ratio rather than a first gear ratio. However, it is actually very difficult to set an optimum combination of the operation parameters to meet a desired operating mode, and furthermore, since the gear ratio changes in a step manner whichever one of a manual transmission and an automatic transmission is used, the vehicle operates unsmoothly if the engine is controlled to operate along the optimum operation line.

Besides, since it is the conventional practice to provide a power enrichment area near the full throttle opening at each engine RPM., viz., so-called "air fuel ratio enrichment range," in order for the engine to produce its power at each engine RPM. over all of the range from low engine RPM. to high engine RPM., the improvement of the fuel economy is limited.

SUMMARY OF THE INVENTION

According to the present invention, a control system for a motor vehicle is provided wherein a continuously variable transmission is employed to continously vary a drive ratio to operate an engine along a predetermined operation line.

Accordingly, an object of the present invention is to provide a control system for a motor vehicle wherein an engine is operated along a predetermined operation line.

BRIEF DESCRIPTION OF THE DRAWINGS

The present invention is further described hereinafter in connection with the accompanying drawings, wherein:

FIGS. 16B and 16C are timing diagrams;

FIG. 23 is a block diagram of a control system using the throttle control mechanism shown in FIGS. 22A, 22B and 22C.

DESCRIPTION OF THE PREFERRED EMBODIMENTS

Figure 1:
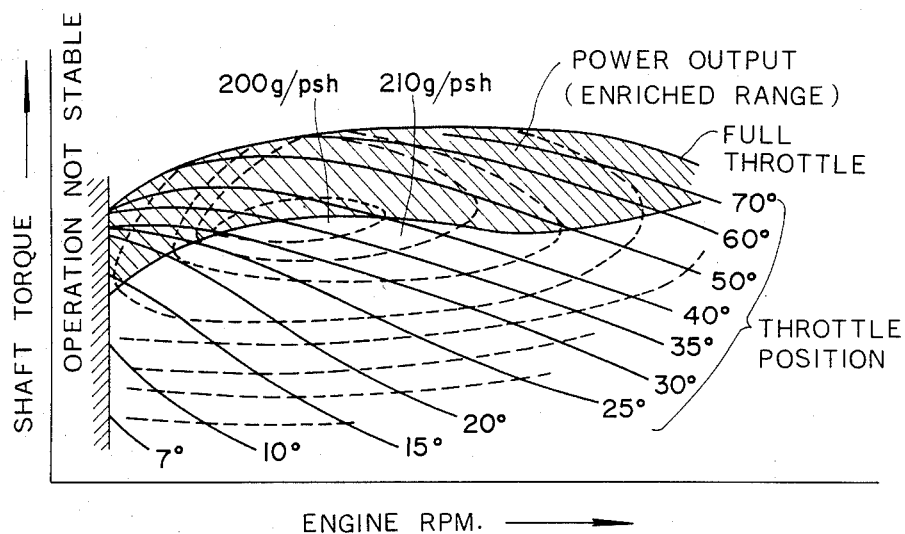
FIG. 1 is a conventional control characteristic of an internal combustion engine of a motor vehicle.
Figure 2:
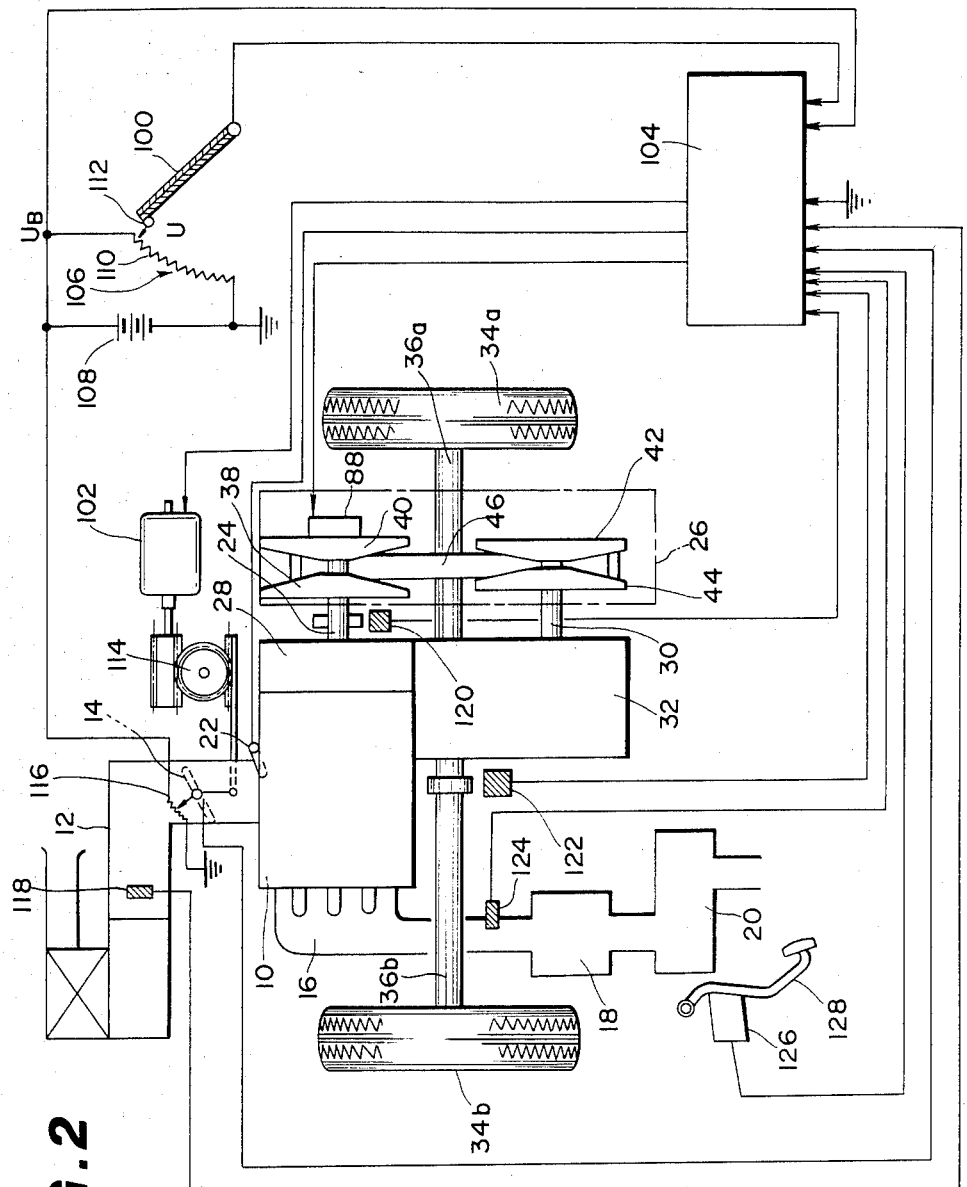
FIG. 2 is an overall block diagram of a control system according to the present invention.

Referring to FIG. 2, a control system for a motor vehicle according to the present invention is described.

As illustrated, an internal combustion engine is generally denoted by 10, the engine having in the usual manner an intake manifold 12 having mounted therein a throttle valve 14 and an exhaust manifold 16 followed by a catalytic converter 18 and a muffler 20. The engine 10 is provided with a fuel supply device in the form of a fuel injection system in this embodiment, only a fuel injector of the fuel injection system being illustrated and denoted by 22.

The power of the engine 10 is transmitted to a shaft 24 of a continuously variable transmission 26 via a clutch 28. The continuously variable transmission 26 has another shaft 30 via which the power is transmitted to a final gear 32 which transmits driving power to traction wheels 34a and 34b via axle shafts 36a and 36b, respectively.

Figure 3:
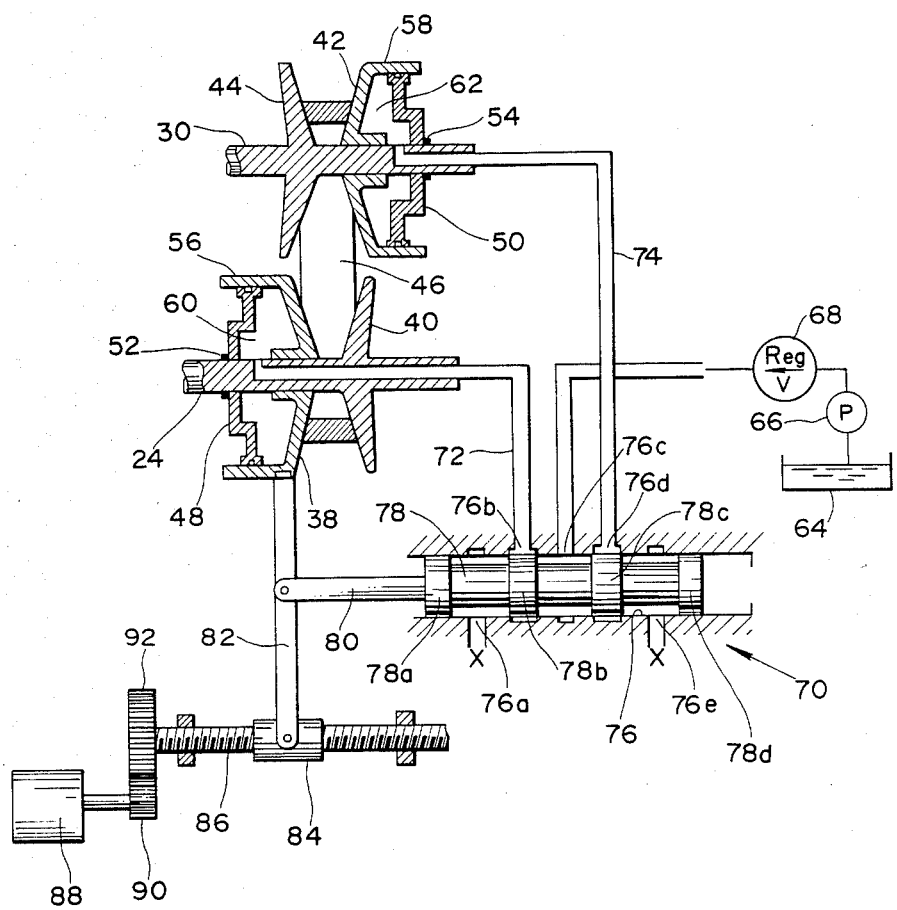
FIG. 3 is a schematic sectional view of the continuously variable transmission of the control system of FIG. 2.

As shown in FIG. 3, the continuously variable transmission 26 comprises two parallel shafts 24 and 30, each of which carries a pair of conical pulley disks 38, 40 and 42, 44, respectively. The conical disks 40 and 44 are mounted on their respective shafts 24 and 30 so as to be nonrotatable, while the conical discs 38 and 42 are mounted on their respective shafts 24 and 30 but slidable thereon in the axial direction. The two pulleys formed by two pairs of conical disks 38, 40 and 42, 44 are connected to each other by a metal belt 46, hereinafter referred to as a "belt."

At the side facing toward the slidable pully disk 38 or 42, each of the shafts 24 and 30 carries a piston 48 or 50 which rests against an end stop 52 or 54 fixedly mounted on the respective shaft 24 or 30. The slidable pulley disk 38 or 42 has a flange 56 or 58 extending axially therefrom which slidably receives the piston 48 or 50. The slidably pully disk 38 or 42, flange 56 or 58 and cylinder 48 or 50 form a pressure chamber 60 or 62.

These pressure chambers 60 and 62 contain a pressure fluid which is supplied thereto from a source of fluid 64 by a pump 66 through a line pressure regulator valve 68, a shift control valve 70, pressure lines 72 and 74, and suitable bores in shafts 24 and 30. Shift control valve 70 has a bore 76 formed with a drain port 76a, an outlet port 76b, an inlet port 76c, an outlet port 76d, and a drain port 76e. A spool 78 is slidably disposed in the bore 76 and is formed with four lands 76a, 78b, 78c and 78d. The line pressure is supplied to the inlet port 76c of the shift control valve 70. The outlet ports 76b and 76d communicate with the chambers 60 and 62, respectively, via the pressure lines 72 and 74, respectively. The axial length of each of the lands 78b and 78c is chosen to be slightly shorter than that of the mating port 76b or 76d. The axial length between the lands 78b and 78c is substantially the same as the axial length between the ports 76b and 76d. Therefore, a portion of the line pressure supplied via the inlet port 76c to a chamber formed between the lands 78b and 78c is allowed to pass through a variable clearance space formed between the one edge of the land 78b and the port 76b to flow into the pressure line 72 while, the remaining portion thereof is allowed to pass through another clearance space formed between the opposite edge of the land 78b and the port 76b to flow into the drain port 76a. Thus, the pressure within the pressure line 72 is determined depending upon the ratio of the one space to the remaining space. In the similar manner, the pressure in the pressure line 74 is determined depending upon the ratio of a space via which a portion of the line pressure is allowed to pass to the pressure line 74 to another space via which the remaining portion is allowed to pass to the drain port 76e. In this case, one clearance space is formed between one edge of the land 78c and the port 76d, while, another clearance space is formed between the opposite edge of the land 78c and the port 76d.

Assume now that the spool 78 is disposed at the center position. The relationship between the land 78b with the port 76b is the same as that of the land 78c with the port 76d, thus allowing the same pressure to appear in the pressure line 72 and in the pressure line 74. As the spool 78 is urged to move leftwardly, the one clearance space of the port 76b on the line pressure side becomes bigger and bigger and the another clearance space thereof on the drain side becomes smaller and smaller, thus allowing the pressure in the pressure line 72 to increase accordingly whereas, the clearance space of the port 76d on the line pressure side becomes smaller and smaller and the clearance space thereof on the drain side becomes bigger and bigger, thus causing the pressure in the pressure line 74 to decrease accordingly. This causes an increase in pressure in the chamber 60 to allow the width of the V-shaped pulley groove to decrease, and a decrease in pressure within the chamber 62, to allow the width of the V-shaped pulley groove to increase, so that because the radius of engagement of the belt 46 with the drive pulley 38, 40 becomes large and the radius of engagement of the belt 46 with the driven pulley 42, 44 becomes small, the drive ratio decreases. Conversely, pushing the spool 78 rightwardly causes the reverse action to that mentioned above to cause an increase in drive ratio.

From the left hand end of the spool 78, viewing in FIG. 3, a rod 80 extends and is pivoted to an intermediate portion of a two-armed lever 82. The lever 82 has its one end received in an annular groove, not shown, formed in the slidable conical disk 38 and has its opposite end pin connected with a sleeve 84. The sleeve 84 is internally threaded to mesh with the thread formed on a rotatable shaft 86 which is rotated by a shift control motor 88, in the form of a stepper motor, via gears 90 and 92. If the shift control motor 88 is urged to rotate the shaft 86 via the gears 90 and 92 in one rotational direction to move the sleeve 84 leftwardly, viewing in FIG. 3, the lever 82 moves angularly clockwise with its end received by the annular groove of the slidable cone disk 38 as an fulcrum point, urging the spool 78 for leftward movement. This movement of the spool 78 causes the slidable cone disk 38 to move rightwardly to decrease the width of the V-shaped pulley groove, while the width of the V-shaped pulley groove between the disks 42 and 44 increases, resulting in a reduction in drive ratio. Since the one end of the lever 82 is engaged by the groove around the flange 56 of the slidable disk 38, moving the slidable cone disk 38 rightwardly will cause the lever 82 to rotate clockwise with that end of the lever 82 which is pin connected to the sleeve 84 as a fulcrum. This causes the spool 78 to tend to move rightwardly back to the initial position. This action causes the spool 78 to take a new balanced position depending upon the amount of step rotation of the shift control motor 88. It goes the same if the shift control motor 88 is urged to rotate the shaft 86 in the opposite rotational direction. Therefore, if the shift control motor 88 is actuated in accordance with a predetermined shift pattern, a drive ratio varies accordingly, thus making it possible to control drive ratio continuously by operating the shift control motor 88, alone.

Referring back to FIG. 2, an accelerator pedal 100 is not directly mechanically connected to the throttle valve 14. The angular position of the throttle valve 14 is adjusted by an electric motor 102, in the form of a stepper motor, which is operated in response to the result of arithmetic operation in a control unit 104 which is later described in more detail in connection with FIG. 4 and FIG. 5. The accelerator pedal 100 is operatively coupled with an accelerator pedal position sensor 106 including a battery 108 and a potentiometer having a variable resistor 110 and an arm 112 cooperating with the variable resistor 110. The arm 112 is connected to the accelerator pedal 100 such that the arm 112 slides on the variable resistor 110 as the accelerator pedal 100 is depressed. With the variable resistor 100, an electric voltage of the battery 108 installed in the vehicle is divided depending upon the amount of depression of the accelerator pedal 100 to provide an accelerator position signal which will be hereinafter abbreviated as an "acc. position signal." Hereinafter, accelerator position will be understood to mean depression degree of the accelerator. The position of the throttle valve 14 is controlled by the electric actuator 102 via a suitable power transmission mechanism like a gearing mechanism 114 as diagrammatically illustrated in FIG. 2. The position of the throttle valve 14 is detected by a throttle position sensor 116 which generates a throttle position signal indicative of the opening degree of the throttle valve 14. Mounted upstream of throttle valve 14 is an air flow sensor 118 which detects the amount of air flow and generates an air flow signal indicative of the amount of air flow. The acc. signal, throttle position signal and air flow signal are fed to the control unit 104.

Engine RPM of the engine 10 is detected by an engine RPM sensor 120 which generates an engine RPM signal indicative of the engine RPM. A vehicle speed sensor 122 is operatively coupled with the axle shaft 36b to generate a vehicle speed signal indicative of the vehicle speed. The engine RPM signal and vehicle speed signal are fed to the control unit 104.

Mounted within the exhaust passageway 16 is an A/F sensor 124 which measures oxgen concentration and generates a A/F signal indicative of the oxgen concentration. The A/F signal is also fed to the control unit 104.

A brake sensor 126 is operatively coupled with a brake pedal 128 to detect the depressed position and the release state of the brake pedal. The brake sensor 126 generates a brake pedal position signal which will be hereinafter abbreviated as a "brake signal" Br. The brake signal is fed to the control unit 104. The brake sensor 126 is illustrated in FIG. 6 or FIG. 7.

Figure 6:
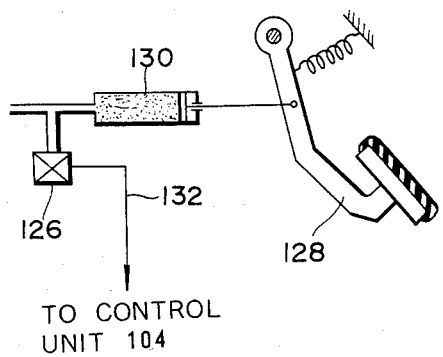
FIG. 6 is a schematic view of the brake sensor 126 of the control system of FIG. 2.
Figure 7:
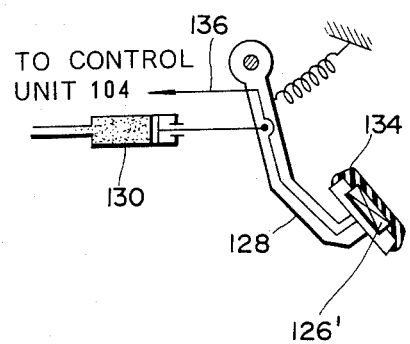
FIG. 7 is another form of the brake sensor.

Referring to FIG. 6, the brake sensor 126 is in the form of a pressure sensor constructed and arranged with respect to a master cylinder 130 such that it generates a brake signal indicative of the magnitude of hydraulic pressure within the master cylinder 130. The brake signal is fed to the control unit 104 via a lead 132. Referring to FIG. 7, there is illustrated another form of a brake sensor. The brake sensor is in the form of a pressure sensor 126' mounted between a brake pedal 128 and a brake pad 134. The pressure sensor 126' generates a brake signal indicative of the magnitude of pressure exerted upon the brake pad 134 by a driver. The brake signal is fed to the control unit 104 via a lead 136.

Figure 4:
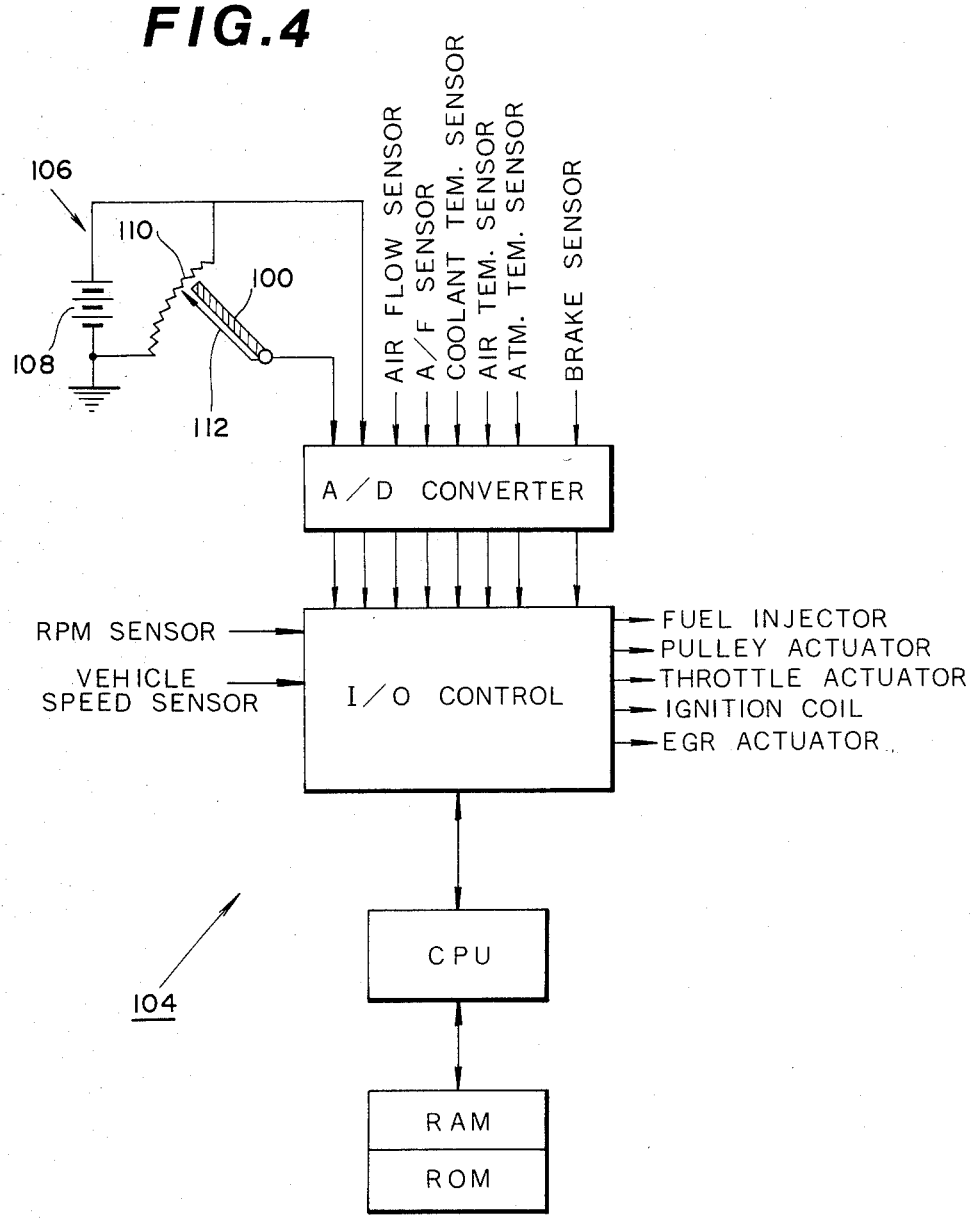
FIG. 4 is a block diagram of the control unit 104 of FIG. 2.

Referring to FIG. 4, the control unit 104 includes a microcomputer which has a CPU, a RAM, a ROM, an I/O control, and an A/D converter.

Figure 5:
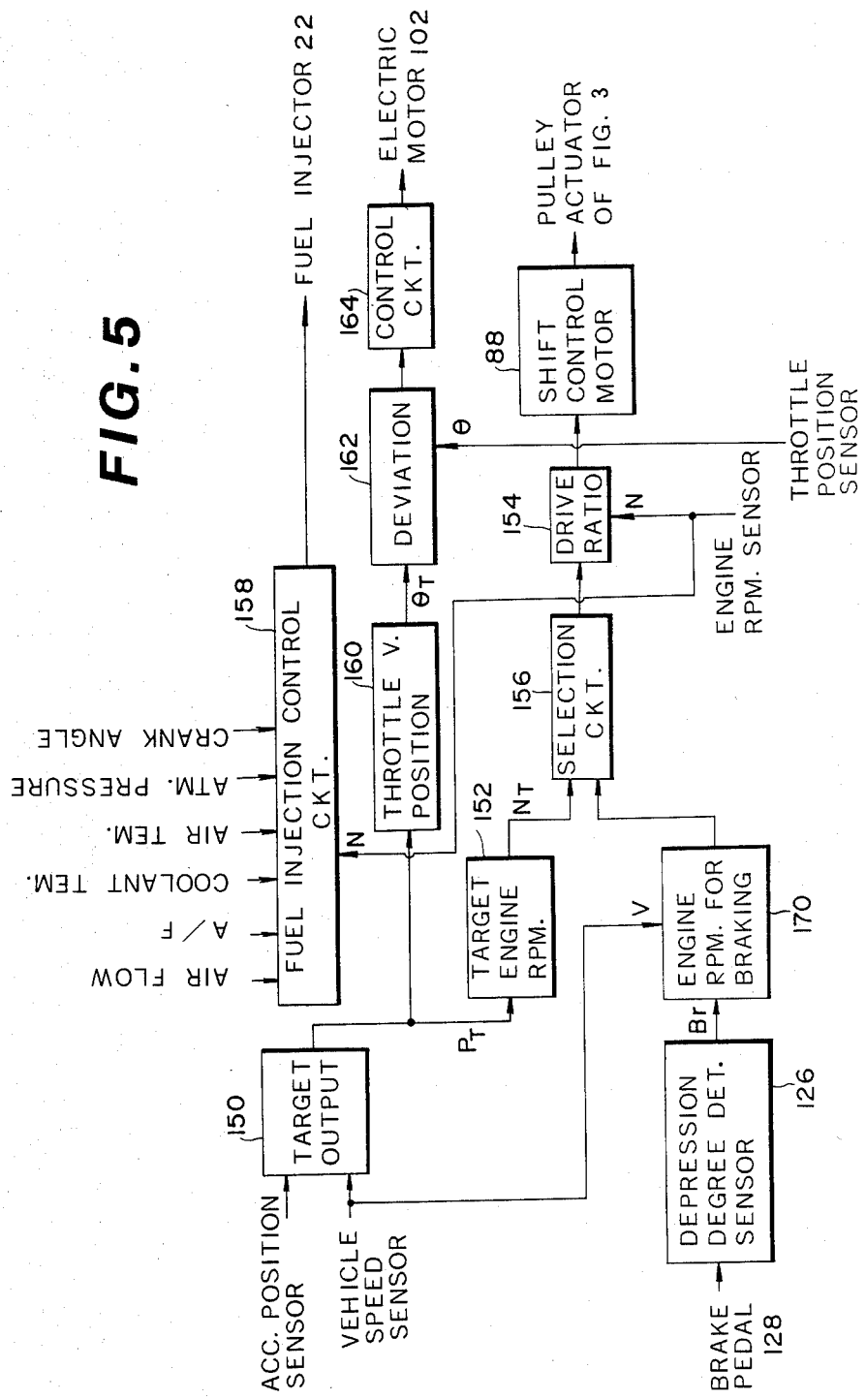
FIG. 5 is a detailed block diagram of the control unit 104 of FIG. 2.

Hereinafter, the control unit 104 is explained referring to a block diagram shown in FIG. 5.

The variable resistor 110 generates an acc. position signal indicative of the depression degree of the accelerator pedal 100. Assuming now that a voltage portion divided out of the battery voltage $U_B$ is U, $U/U_B=1$ when the accelerator pedal 100 is released, and $U/U_B$ becomes smaller than 1 as the accelerator pedal 100 is depressed.

Figure 8:
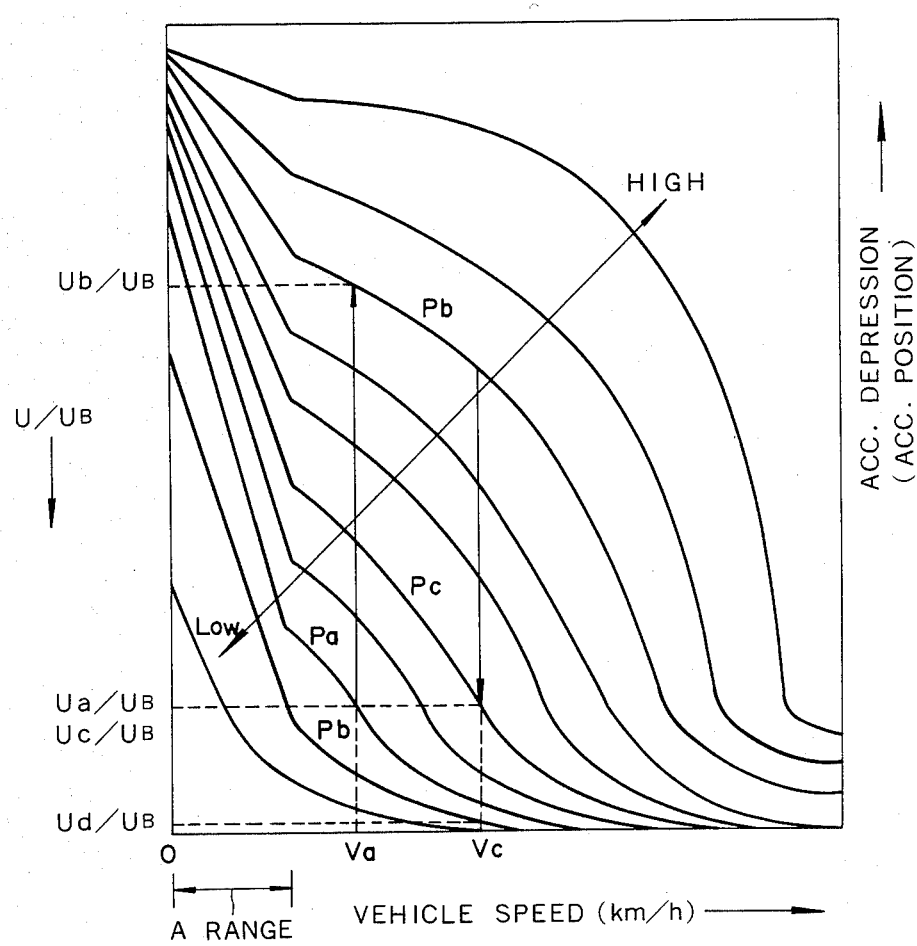
FIG. 8 shows isooutput lines and each connecting points with equal engine output which are expressed in terms of acc. position and vehicle speed.

The acc. position signal $U/U_B$ and the vehicle speed signal V are fed to a target output defermination block 150. In the block 150, a table look-up of FIG. 8 stored in the ROM is carried out based upon acc. position signal $U/U_B$ and vehicle speed signal V and generates a target output signal $P_T$. FIG. 8 shows engine isooutput lines, each connecting points of equal output which are experimentarily determined.

Figure 10:
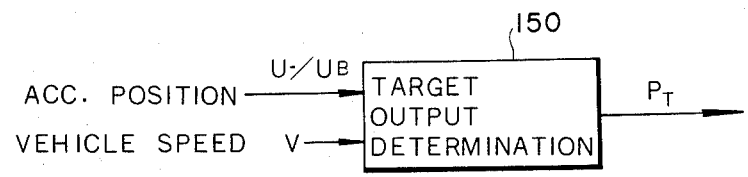
FIG. 10 is a block diagram of the target output determination block 150 of the control system of FIG. 2
Figure 10A:
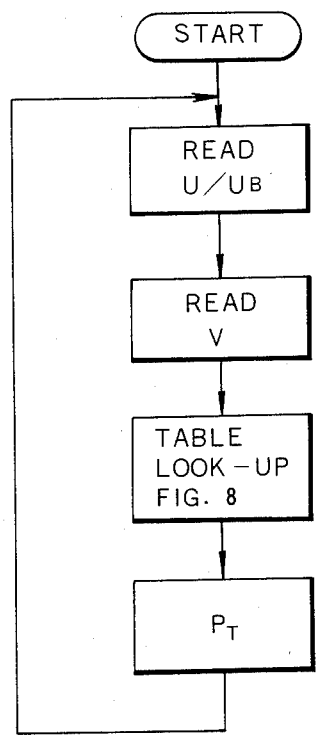
FIG. 10A is a flowchart for this block 150.

Referring to FIGS. 8, 10 and 10A, explanation is made how the target output $P_T$ is determined by the block 150. Vehicle speed signal V from vehicle speed sensor 122 and acc. position signal $U/U_B$ from accelerator pedal position sensor 106 are read and based upon the read values of the vehicle speed signal and the acc. position signal table look-up of FIG. 8 is carried out to determine a target output $P_T$.

Figure 9:
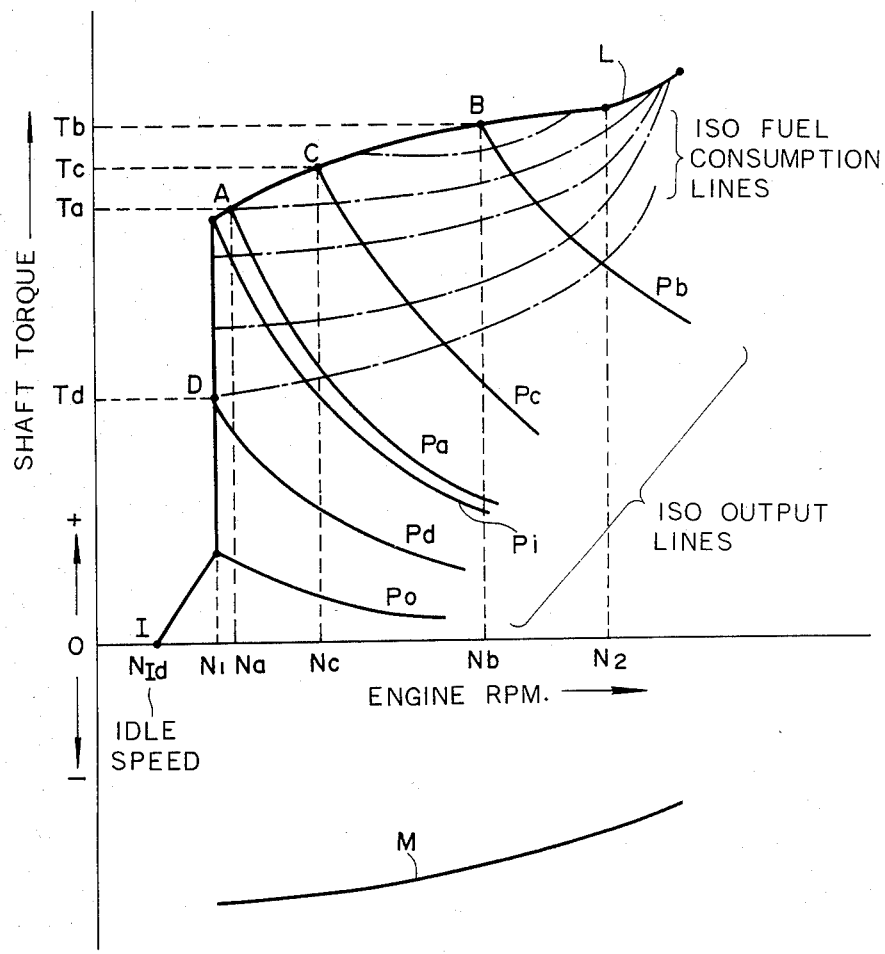
FIG. 9 shows an operation line.

The target output signal $P_T$ is fed to a target engine RPM determination block 152. In the block 152, a table look-up of FIG. 9 is carried out based upon target output $P_T$. FIG. 9 illustrates isooutput lines Po, Pd, Pi, Pa, Pc, and Pb, each connecting points of equal engine output, and isofuel consumption lines, shown by one dot chain line, each connecting points with equal fuel consumption. Each of the isooutput lines is expressed in terms of shaft torque and engine RPM in FIG. 9.

On each of isooutput lines in FIG. 9, an operation point is chosen such that the engine RPM and engine shaft torque expressing this operation point provide operation state wherein exhaust emission is low, thermal efficiency (fuel economy) of engine is good and stable operation of engine is ensured. An engine operation line L connects the operation points on the isooutput lines. The data expressing this operation line are stored in the ROM.

Figure 11:
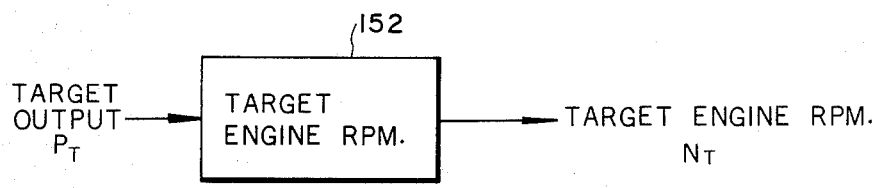
FIG. 11 is a block diagram of the target engine rpm. determination block 152 of the control system of FIG. 2.
Figure 11A:
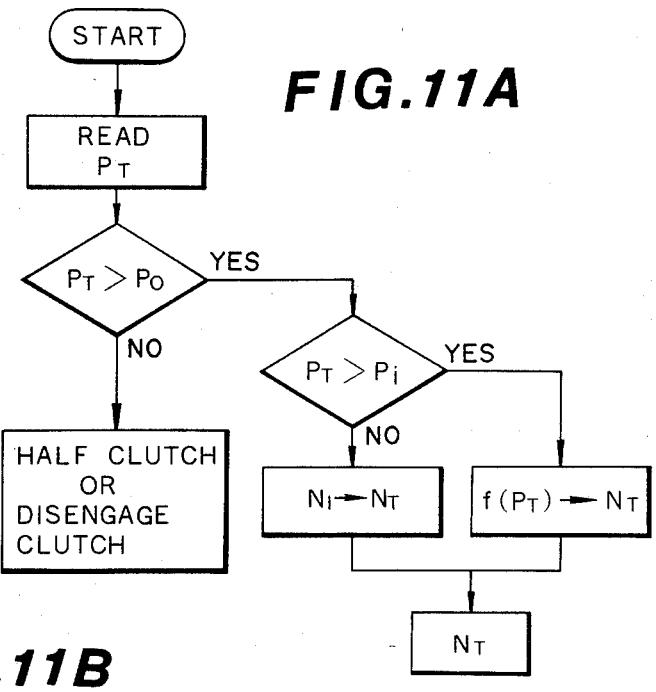
FIG. 11A is a flowchart for this block 152.
Figure 11B:
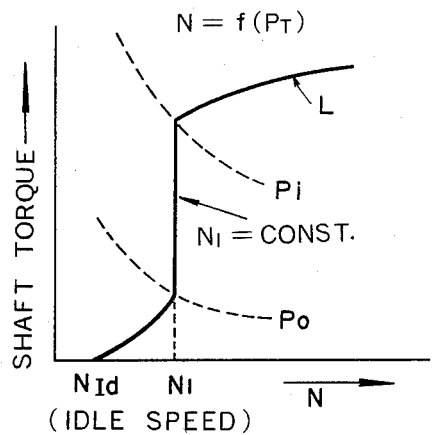
FIG. 11B is a simplified representation of the operation line L shown in FIG. 9.

Referring to FIGS. 9, 11, 11A and 11B, explanation is made how the target engine RPM $N_T$ is determined in the block 152. Referring to FIGS. 9 and 11B, it will be noted that the operation line L is divided into three sections by two isooutput lines Po and Pi. The line section of the operating line L which is defined by the isooutput lines Po and Pi is constant irrespective of variation in engine shaft torque. Thus, the target engine RPM remains N1 (constant) as long as the target output $P_T$ is higher than a lower predetermined output Po and not higher than a higher predetermined output Pi (see FIG. 11B). If the target output $P_T$ is higher than the higher predetermined value Pi, the operation line L satisfies the relationship $N_T=f(P_T)$ so that the target engine RPM is given by $N_T=f(P_T)$. If the target output $P_T$ is lower than the lower predetermined output Po, the clutch 28 is maintained in a half clutch state. The clutch 28 is completely disengaged if the engine speed drops further to ensure idle operation of the engine.

Referring particularly to FIG. 9, when the engine RPM falls in a predetermined range wherein engine RPM N is lower than N1 (in the drawing, a range defined by $N_{Id} \leq N < N1$), the clutch 28 is put in half clutch state. If engine RPM N drops further ($N < N_{Id}$), the clutch 18 is completely disengaged to provide a neutral state. When the engine RPM falls in an operation range wherein the engine RPM is constant N1, the clutch 18 is fully engaged. This constant value N1 is chosen as a result of total consideration of degree of stability of the engine operation as well as that of the vehicle operation, and control of shaft torque of the engine at this constant value N1 is carried out by adjusting the amount of fuel supply, such as, controlling the position of the throttle valve 14. When the engine RPM falls within a range wherein, the engine RPM is higher than N1, the throttle valve 14 is maintained in a nearly fully open position and the control of the shaft torque is carried out by controlling drive ratio by operating the continuously variable transmission.

Figure 12:
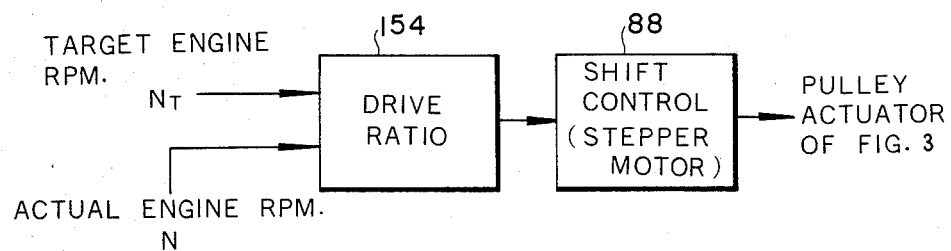
FIG. 12 is a block diagram of the drive ratio determination block 154 of the control system of FIG. 2
Figure 12A:
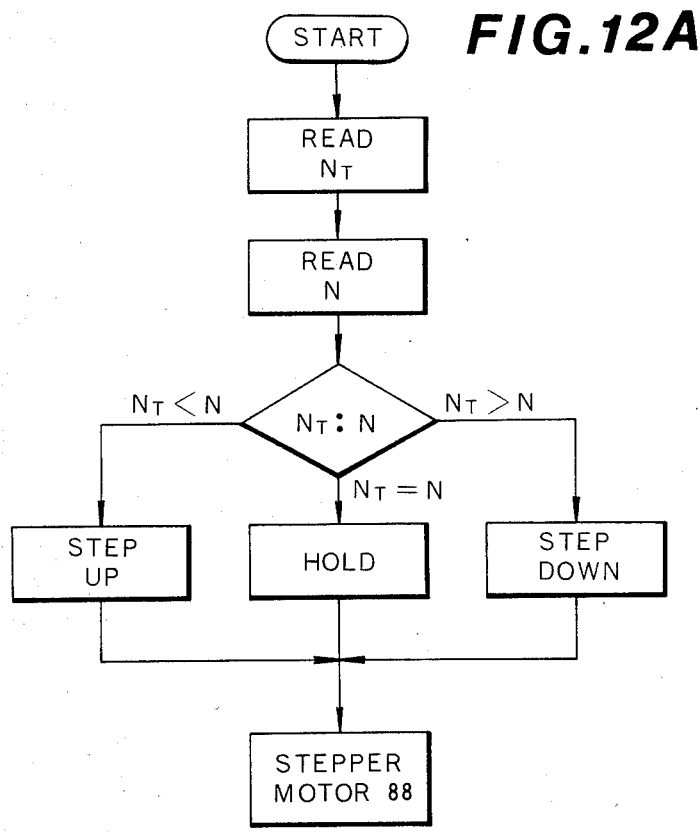
FIG. 12A is a flowchart for this block 154.

Referring to FIGS. 12 and 12A, explanation is made of to control the stepper motor 88 so as to change a drive ratio of the continuously variable transmission 26. The target engine RPM $N_T$ and actual engine RPM N from the engine RPM sensor 120 are read and these read values are compared with each other. If the actual engine RPM N is higher than the target engine RPM $N_T$, the stepper motor 88 is instructed to step up for step rotation in such a direction as to decrease drive ratio, resulting in a reduction in engine RPM. If the actual engine RPM N is lower than the target engine RPM $N_T$, the stepper motor 88 is instructed to step down for step rotation in the opposite direction to increase a drive ratio, resulting in an increase in engine RPM. If the actual engine RPM N is equal to the target engine RPM $N_T$, the stepper motor 88 is left as it is.

Figure 14:
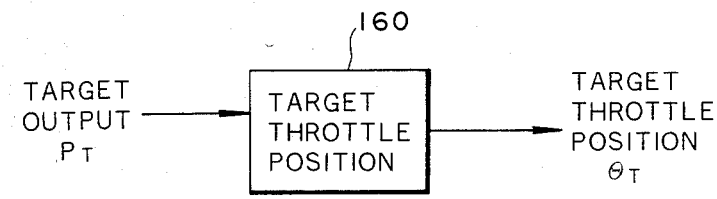
FIG. 14 is a block diagram of the target throttle position determination block 160 of the control system of FIG. 2.
Figure 14A:
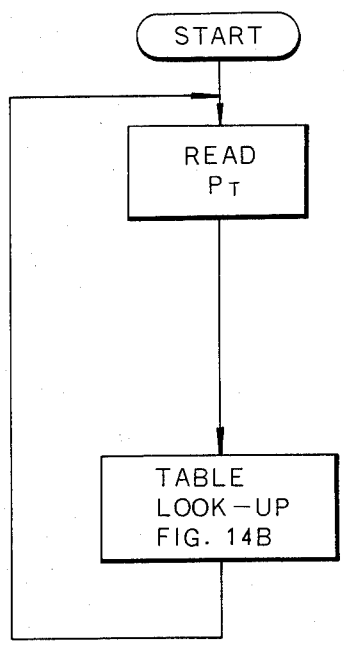
FIG. 14A is a flowchart for this block 160.
Figure 14B:
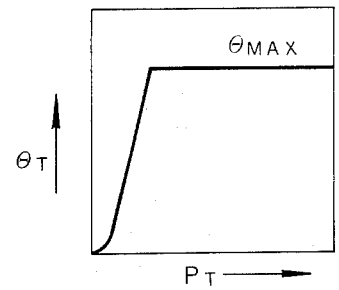
FIG. 14B is a table used to determine the target throttle position.

Referring to FIGS. 14, 14A and 14B, an explanation is made how to determine a target throttle position $\theta_T$ from the target output $P_T$ from the block 150. The target output $P_T$ from the target output determination block 150 is read and based on the read target output $P_T$ table look-up of FIG. 14B is carried out. Referring to FIG. 14B, the target throttle position increases as the output increases until the output increases to a predetermined value, such as Pi (see FIG. 9), but the throttle position is maintained at the maximum value $\theta_{MAX}$ irrespective of the variation in output as long as the output is higher than the predetermined value. The target throttle position $\theta_T$ is fed to a deviation determination block 162 which is explained hereinafter in connection with FIGS. 15 and 15A.

Figure 15:
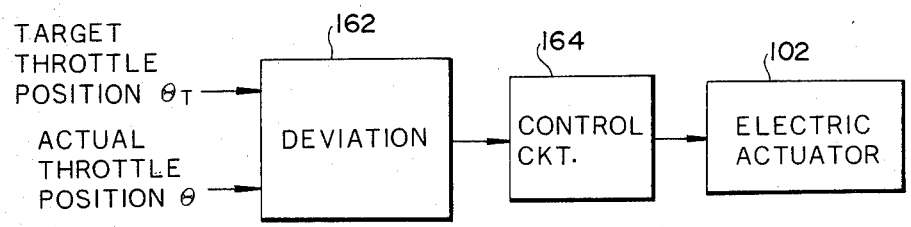
FIG. 15 is a block diagram of the deviation determination block 162 of the control system of FIG. 2 and the control block 164 thereof.
Figure 15A:
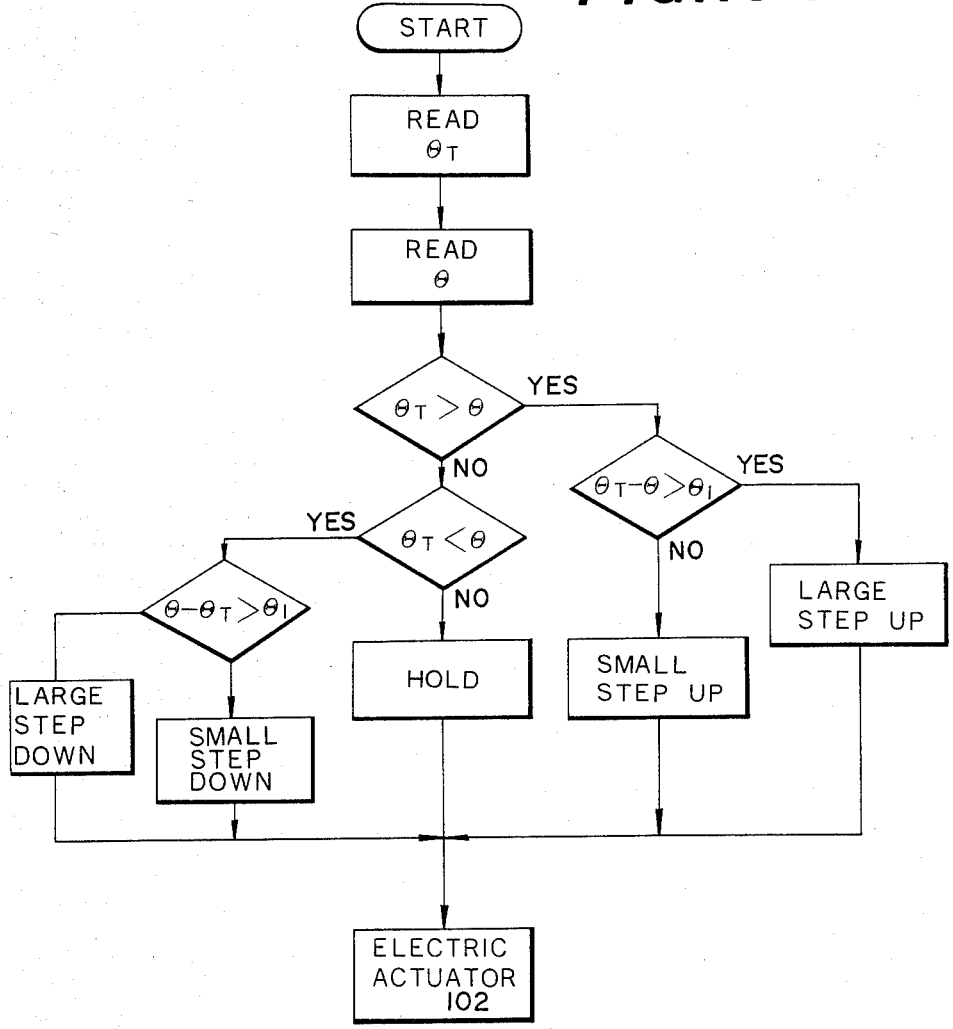
FIG. 15A is a flowchart for these blocks 162 and 164.

Referring to FIGS. 15 and 15A, an explanation is made of how to reduce the difference between the target throttle position $\theta_T$ and the actual throttle position $\theta$. The target throttle position $\theta_T$ and actual throttle positions $\theta$ are read. If the actual throttle position $\theta$ is smaller than $\theta_T$, the difference between $\theta_T$ and $\theta$ is compared with a predetermined magnitude $\theta_1$. If the difference is not larger than $\theta_1$, the electric actuator in the form of stepper motor is instructed to step up by small increments the forward direction so as to open throttle valve 14 by a small angular degree. If the difference is larger than $\theta_1$, the stepper motor 102 is instructed to step up by large increments in the forward direction as to open the throttle valve 14 by a large angular degree. If the actual throttle position $\theta$ is equal to the target throttle position $\theta_T$, the stepper motor 102 is instructed to hold the current throttle position. If the actual throttle position $\theta$ is larger than the target throttle position $\theta_T$, the difference between the actual throttle position $\theta$ and the target throttle position $\theta_T$ is compared with the predetermined magnitude $\theta_1$. If the difference is not larger than the predetermined magnitude $\theta_1$, the stepper motor 102 is instructed to step down by small increments in the reverse direction so as to close the throttle valve 14 by a small angular degree. If the difference is larger than the predetermined magnitude $\theta_1$, the stepper motor 102 is instructed to step down by a large increments in the reverse direction so as to close the throttle valve 14 by a large angular degree.

Figures 16, 16A:
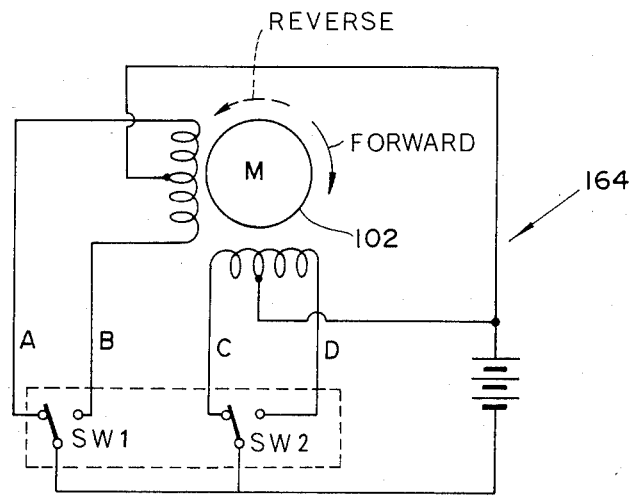
FIG. 16 is a circuit diagram of the stepper motor 102.
FIG. 16A is a table of excitation sequence of the stepper motor 102.

Referring to FIG. 16, a circuit diagram for the stepper motor 102 is illustrated which includes a first switch SW1 adapted to close one of two circuits A and B, selectively, and a second switch SW2 adapted to close one of two circuits C and D, selectively. FIG. 16A shows which state each of the two switches SW1 and SW2 may take when the stepper motor 102 is instructed to step up 1, 2, 3, 4, 1, . . . for step forward rotation or when the stepper motor 102 is instructed to step down 4, 3, 2, 1, 4, . . . for step reverse rotation. FIG. 16B is a timing diagram of voltage on each of the circuits A, B, C and D as the stepper motor 102 effects step rotation in the forward direction. FIG. 16C is a timing diagram of voltage on each of the circuits A, B, C and D as the stepper motor effects step rotation in the reverse rotation. It will be understood that a relatively large step up or step down is possible only by increasing the number of the steps.

Referring to FIGS. 2, 3, 5, 8, and 9, it is now assumed that a driver of the vehicle depresses the accelerator pedal 100 from acc. position $U_a/U_B$ to a new acc. position $U_b/U_B$. Assume now that the vehicle speed is Va, the engine RPM is higher than N1 and the engine output is Pa right before depressing the accelerator pedal 100. The engine RPM N is higher than N1 so that the throttle valve 14 is fully opened. If the accelerator pedal 100 is depressed to the new acc. position $U_b/U_B$, the target output, increases from the level of the isooutput line Pa to the level of a new isooutput line Pb (see FIG. 8).

Then, a drive ratio is controlled by the continuously variable transmission 26 in such a manner that engine RPM and shaft torque increase along the operation line L from the point A to another point B on the isooutput line Pb. During this operation, the throttle valve 14 is maintained near the fully opened position because the engine RPM is higher than N1.

The continuously variable transmission 26 is operated as follows. Target output determination circuit 150 determines a new target output Pb by looking up FIG. 8 based upon acc. position Ub/$U_B$ and vehicle speed Va, and the new target output Pb is fed to the target engine RPM determination block 152. Based on the new target output Pb the table look-up of the operation line L in FIG. 9 is effected to determine a new target engine RPM Nb corresponding to a new operation point B on the operation line L. The new target engine RPM Nb is fed to the drive ratio determination block 154, wherein the actual engine RPM N is lower than the new target engine RPM Nb, the stepper motor 88 is instructed to step down for step rotation in such a direction as to cause the continuously variable transmission 26 to increase the drive ratio. This increase in drive ratio causes an increase in engine RPM from Na to Nb. This causes an increase in engine output from Pa to Pb, thus urging the vehicle running initially at a vehicle speed Va to accelerate to increase the vehicle speed.

If upon the vehicle increasing up to a target vehicle speed Vc as a result that the driver has kept depressing the accelerator pedal 100 the driver allows the accelerator pedal 100 to reduce its depression degree to a new acc. position Uc/$U_B$ (see FIG. 8), the target output block 150 sets a new target output Pc by table look-up of FIG. 8. This allows the vehicle to run at the constant speed Vc. On the other hand, the engine RPM decreases down to a new engine RPM Nc that corresponds to an operation point C on the isooutput line Pc (see FIG. 9).

Control of shaft torque along the operation line L at engine RPM N1 is carried out by controlling the throttle position of the throttle valve 14. The throttle valve 14 is controlled by the stepper motor 102. When the engine operates on the operation line L at the engine RPM N1 (see FIG. 9), the throttle position of the throttle valve 14 is set to a value corresponding to the target output Pd, thus producing a new shaft torque Td.

Referring to FIG. 9, if a deceleration be initiated at point C on the operation line L wherein engine RPM is Nc, what the driver releases the accelerator pedal 100 to a smaller acc. position Ud/$U_B$ from vehicle speed Vc. Then, a new target output Pd is determined by table look-up of FIG. 8 and the engine is controlled along the operation line L from point C to point D shown in FIG. 9.

Referring to this control, as long as the control is along the operation line L from the point C until an engine speed higher than $N_1$, the control is carried out by the continuously variable transmission 26, whereas the control on the operation line at the engine RPM $N_1$ is carried out by controlling the throttle position of the throttle valve 14 in a manner shown in FIG. 14B. The engine RPM therefore drops from Nc to N1, whereas the engine shaft torque from Tc to Td.

When, during the deceleration operation, vehicle speed has dropped down to Va, if the driver depresses the accelerator pedal 100 again to Ua/$U_B$, the engine output increases to Pa, allowing the vehicle to cruise at vehicle speed Va wherein engine RPM is Na and engine shaft torque is Ta.

If, during the above mentioned deceleration operation, the driver demands a stronger deceleration than the degree of deceleration obtained by releasing the accelerator pedal 100, he depresses the brake pedal 128, causing the brake sensor 126 to deliver brake signal Br to an engine RPM determination block for braking operation 170.

Figure 17:
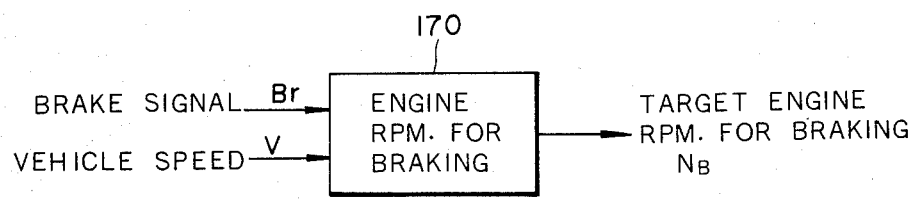
FIG. 17 is a block diagram of the target engine RPM. determination block 170 for braking operation.
Figure 17A:
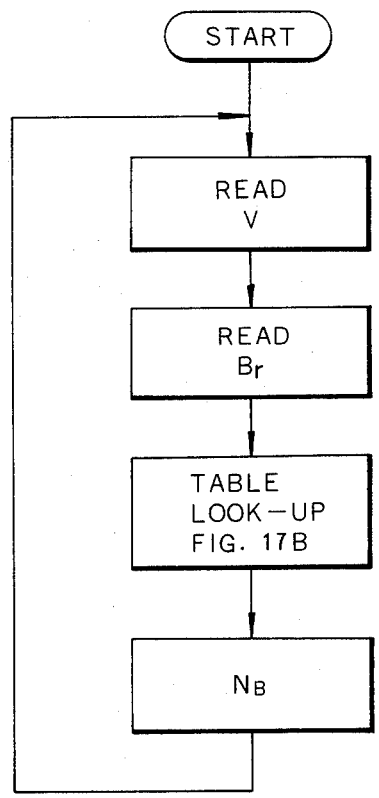
FIG. 17A is a flowchart for this block 170.
Figure 17B:
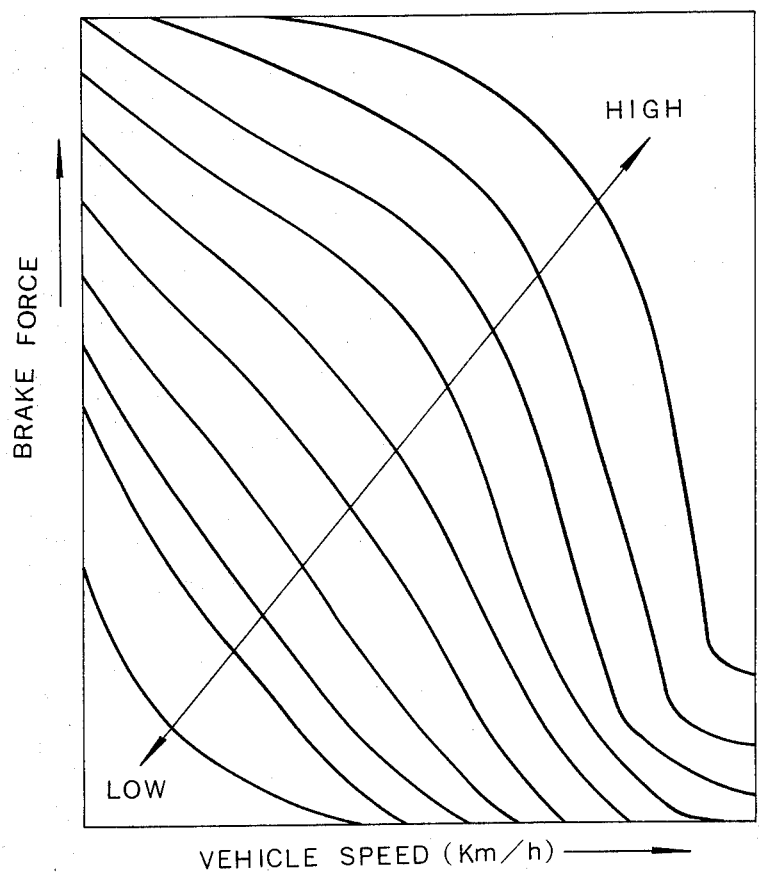
FIG. 17B is a table used to determine the target engine RPM. for any given braking effort.

Referring to FIGS. 17, 17A and 17B, an explanation is made of how to ensure effective engine braking. A target engine RPM for braking operation is determined by the block 170. Vehicle speed and brake signal are read and based on them a table look-up of FIG. 17B is carried out to determine the target engine RPM suitable for the vehicle speed and brake signal. FIG. 17B shows iso-engine RPM lines each connecting points with equal engine RPM.

The output signal indicative of the target engine RPM for braking is fed to the selection circuit 156 wherein, upon receiving the output signal from the block 170, the transmission of the output signal from the target engine RPM block 152 to the drive ratio determination block 154 is interrupted. The stepper motor 102 is excited to close the throttle valve 14 immediately upon depression of the brake pedal 128. The shift control motor 88 urges the continuously variable transmission 26 to vary drive ratio depending upon the demanded degree of deceleration, thus ensuring the effective engine braking. The degree of engine braking may be controlled by controlling drive ratio. Advantageously, from the standpoint of reduction in fuel consumption, a signal commanding the complete fuel cutoff of the supply of fuel should be fed to the fuel injection control 158 to effect a stronger engine braking. FIG. 9 shows an engine brake line M (with the throttle valve almost fully closed) provided when the fuel cutoff is effected. At a stage when vehicle speed V drops below a certain constant vehicle speed, the supply of fuel resumes and the clutch 28 is disengaged, thus allowing the engine to idle (N=$N_{Id}$ in FIG. 9). Then, the throttle valve 14 is closed by the electric actuator 102 to the idle position to maintain the idle speed.

With the above-mentioned brake control circuit 126, 170, it is also possible to increase engine braking effect, if the engine RPM braking circuit 170 is set to provide a predetermined engine RPM value suitable for a given output signal from the sensor 126 and the strength of braking force to change the pulley ratio in the continuously variable transmission 26.

Within an operation range wherein a high output power is demanded and the engine speed exceeds N2 (see FIG. 9), the air-fuel ratio is controlled in such a manner as to enrich the air-fuel ratio for power demand. The engine then produces its maximum performance for higher power output. The target output determination block 150 that the driver demands a high engine output in response to the state of acc. position signal from the accelerator pedal position sensor 106 and vehicle speed signal from the vehicle speed sensor 122 and generates a signal demanding an increase in fuel.

Figure 13:
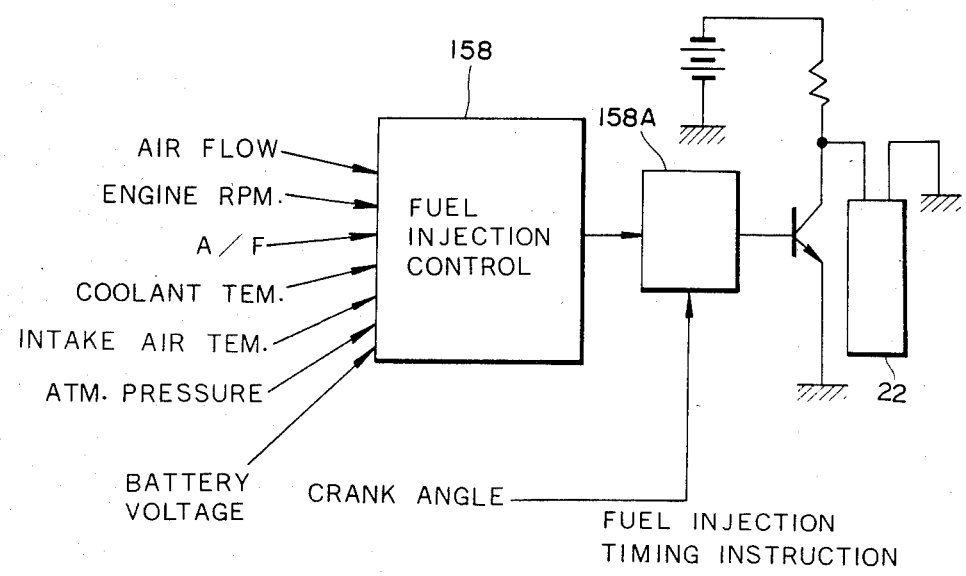
FIG. 13 is a block diagram of the fuel injection control block 158 of the control system of FIG. 2
Figure 13A:
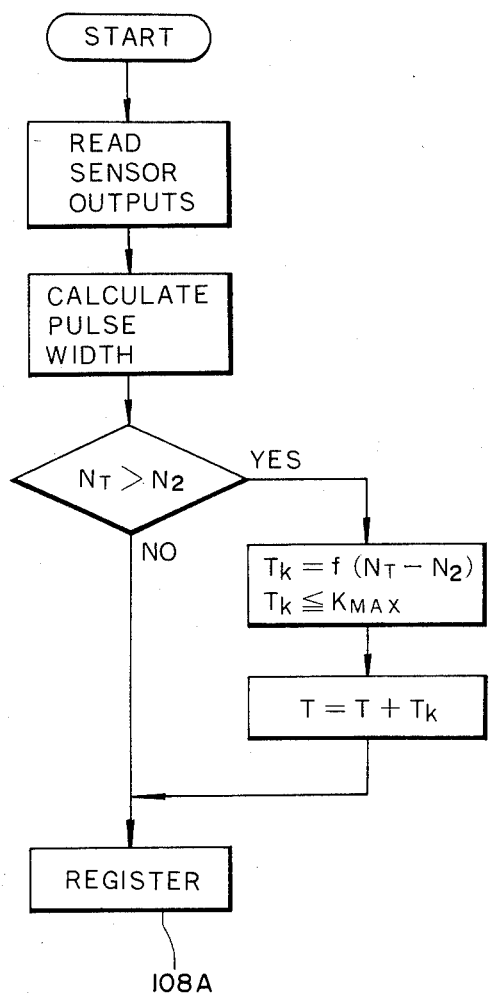
FIG. 13A is a flowchart for this block 158.

Referring to FIGS. 13 and 13A, brief explanation is made of how to increase the amount of fuel when the actual engine RPM N is higher than engine RPM N2. The base pulse width T of fuel injection pulse is determined. The actual engine RPM and engine RPM N2 are compared with each other and if the actual engine RPM N is higher than N2, an increased amount Tk is calculated. Tk is expressed by the following equation, i.e., Tk=f(N−N2). Therefore, the increased amount of fuel is dependent on the difference between the actual engine RPM N and N2. The resultant pulse width T is given by the sum of the base pulse width T and the increased amount Tk, i.e., T=T+Tk.

The control of the amount of fuel is carried out by the fuel injection control 158 which controls the ratio of valve opening to valve closing for the fuel injector 22 in a known manner in response to such input signals as A/F signal from A/F sensor 124, an air flow signal from air flow sensor 118, an engine RPM signal from engine RPM sensor 120 such that during a running state wherein the production of high output from the engine is not required (viz., cruising operation range), the air fuel ratio is kept at the stoichiometry with the throttle valve 14 almost fully opened, whereas, during operation range wherein the maximum output of the engine is required, i.e., at acceleration or hill climbing or at the highest speed running, the air fuel ratio is enriched to provide a satisfactory running performance. During the above-mentioned cruising state, it is preferable to set the air fuel ratio at the stoichiometry or the lean side therefrom with the throttle valve 14 kept near the fully open position so as to lower the pumping loss and the possibility of throttle valve damage.

Referring to FIG. 9, a group of isofuel consumption lines are illustrated by the one-dot chain line if the air fuel ratio is set at the stoichiometry during operation with the engine RPM falling in a range between N1 and N2 and if the air fuel ratio is enriched during operation with engine RPM higher than N2. As will be readily appreciated from FIG. 9, the operation line L used in the present embodiment passes through operation points wherein the fuel consumption is good during operation with engine RPM falling in a range between N1 and N2.

Figure 18:
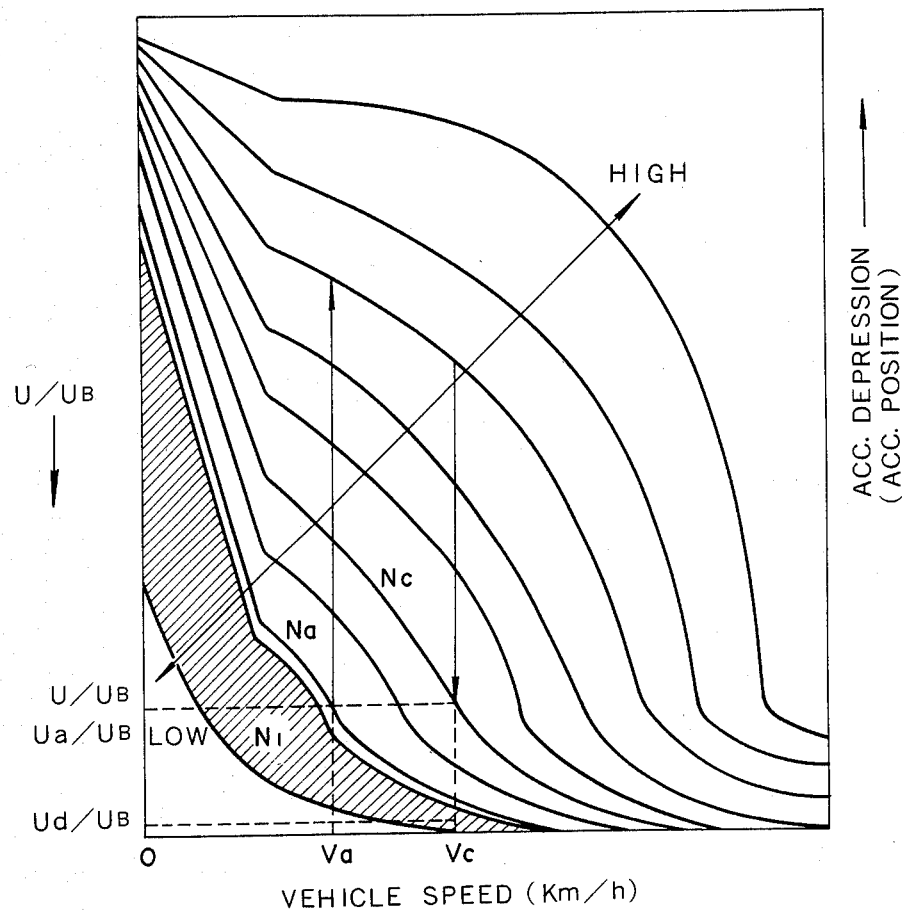
FIG. 18 is modified table used to determine a target engine RPM. based upon the accelerator position and vehicle speed.
Figure 19:
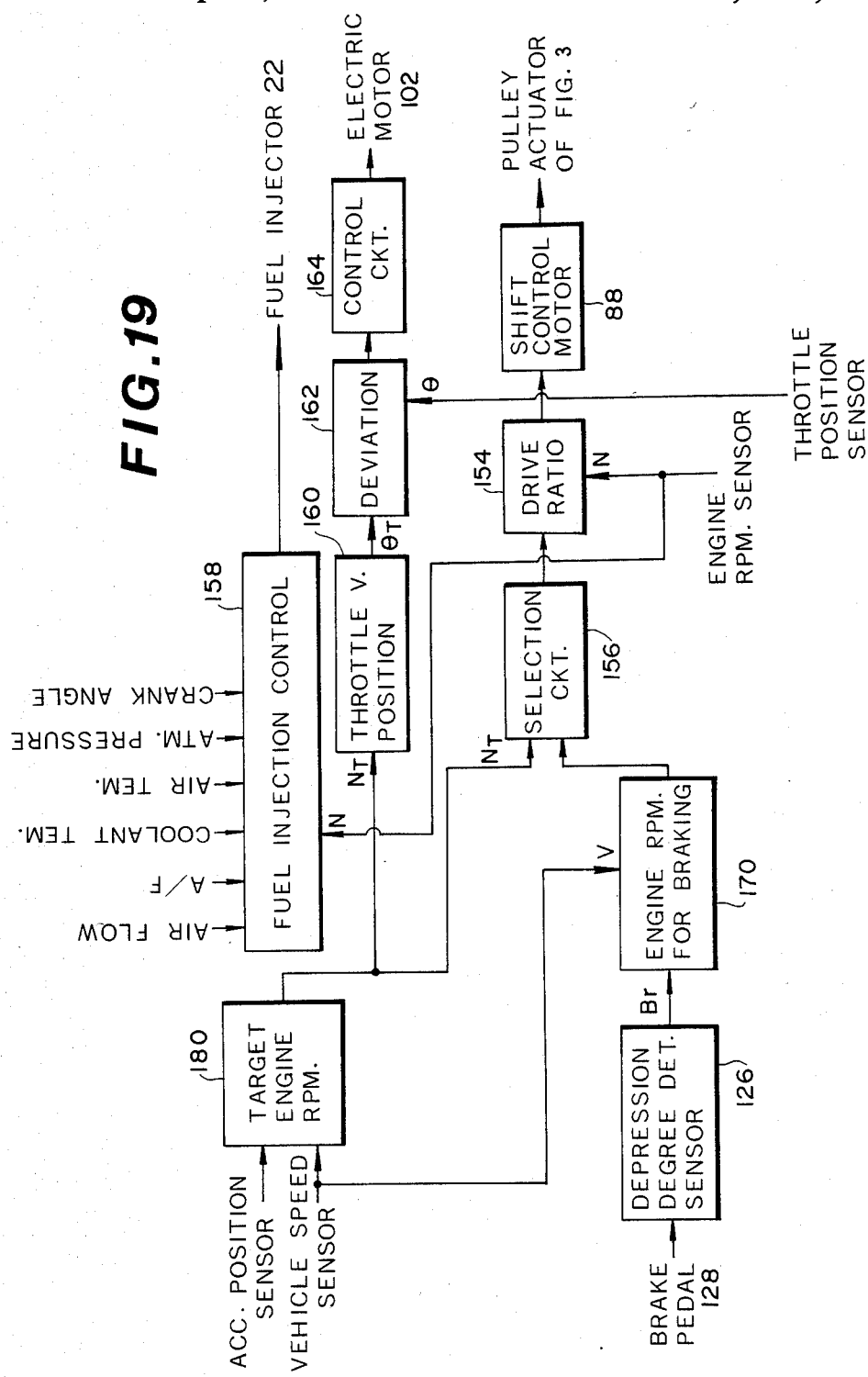
FIG. 19 is a similar view to FIG. 5 showing a second embodiment using the table shown in FIG. 18 to determine the target engine RPM.

In the above-mentioned embodiment, the isooutput lines shown in FIG. 8 in terms of vehicle speed and acc. position are chosen so that within a low vehicle speed range (A range in the drawing) the resolving power of target output on the low output side is increased and the maximum output is produced during operation within fully opened accelerator opening range, and the acc. position is kept generally constant irrespective of vehicle speed during cruising and an increase in acc. position from the level of acc. position for cruising is generally proportional to an increase in output from the level of output for cruising. This makes it easy for a driver to manipulate the accelerator pedal, thus improving the drive feel, owing to the fact that an increase in output varies in general proportion to an increase in depression degree of the accelerator pedal. The values in this table may be changed in response to a change in the required operation characteristic. Although, in the case of the table, the target values are expressed in terms of vehicle speed and acc. position for obtaining the target engine RPM for target output using the operation line L shown in FIG. 9, it is possible to provide the target engine RPM values in a table as shown in FIG. 18 by combining the above two processes. The block diagram using the table shown in FIG. 18 instead of tables shown in FIGS. 8 and 9 is illustrated in FIG. 19 wherein a target engine RPM block 180 that effects a table look-up of FIG. 18 has replaced the target output block 150 and target engine RPM block 152 which were used in the embodiment illustrated in FIG. 5.

Figure 20:
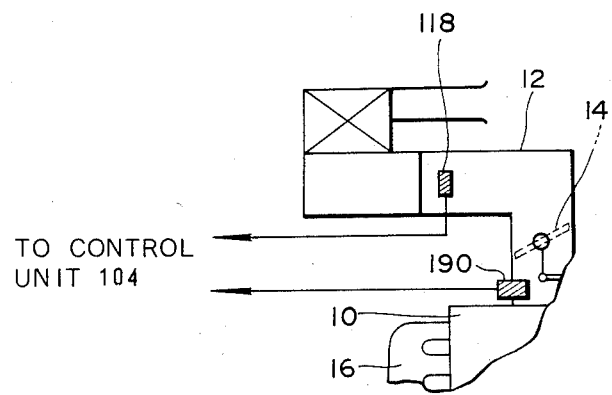
FIG. 20 is a fragmentary view of a FIG. 2 showing only a modified portion of the control system of FIG. 2.
Figure 21:
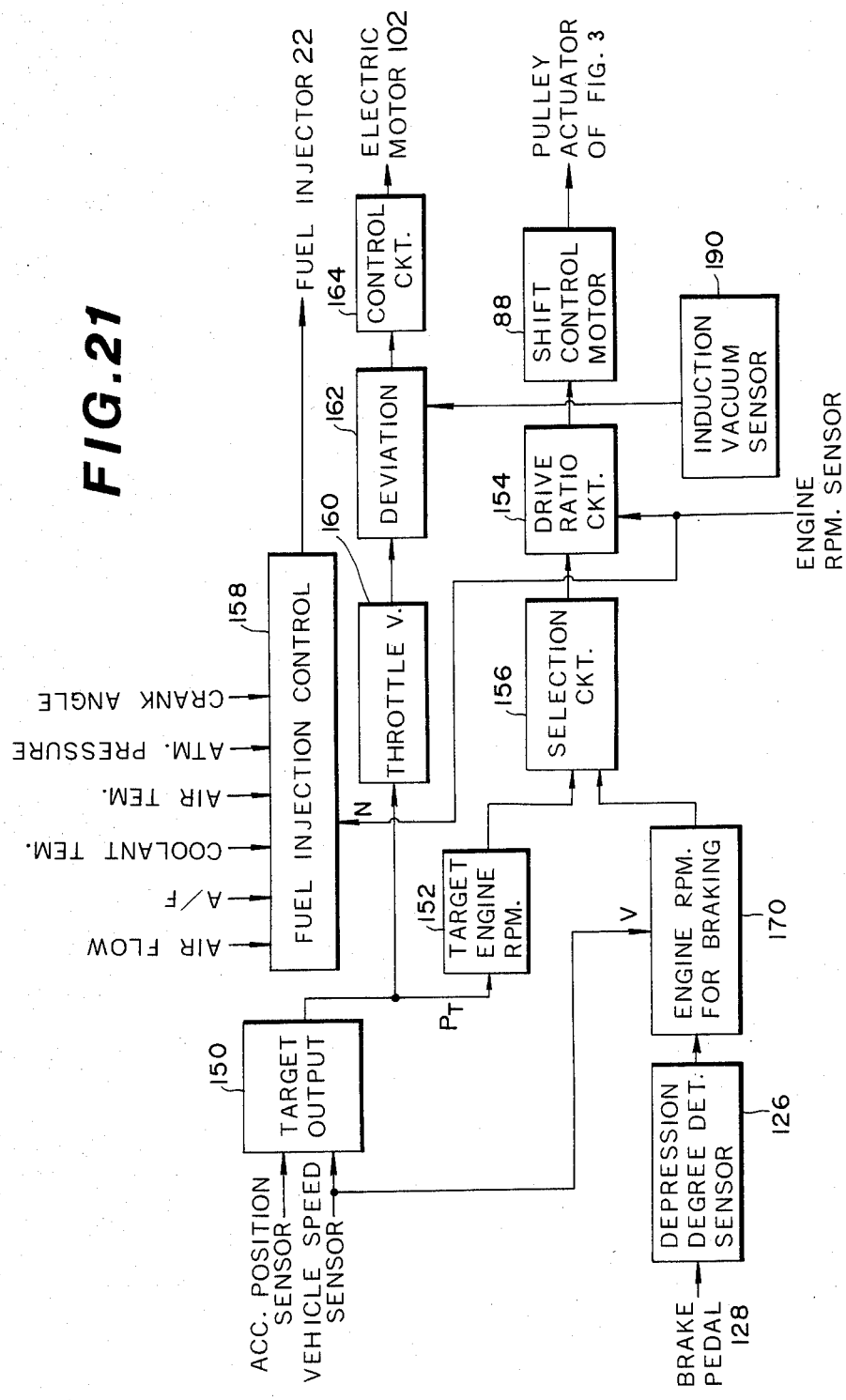
FIG. 21 is a block diagram of control system using the induction vacuum sensor 190 instead of the throttle position sensor 116.

Referring to another embodiment shown in FIG. 20 and 21, the throttle position sensor 116 used in the preceding embodiments has been replaced with an induction vacuum sensor 190 arranged to detect the manifold vacuum downstream of the throttle valve 114. The induction vacuum sensor 190 generates an induction vacuum signal indicative of the opening degree of the throttle valve because the strength of the manifold vacuum varies in response to the position of the throttle valve 14. As shown is FIG. 21 the induction vacuum signal is fed to a deviation circuit within a control unit where it is compared with a target induction vacuum indiucative of a target throttle valve opening. Based on the comparison result the electric actuator 102 for the throttle valve 14 is controlled in such a manner as to reduce the difference between the actual induction vacuum and the target inducation vacuum toward zero. The target induction vacuum corresponds to the power output which is determined by the throttle opening degree. The other constructions are the same as the preceding embodiment.

Referring to a still another embodiment illustrated in FIGS. 22A, 22B, 22C and 23, throttle valve 14 is not actuated by the electric actuator 102 as in the preceding embodiments, but by an accelerator pedal 100 using a variable link mechanism 200 transmitting the movement of the accelerator pedal 100 to the throttle valve 14. The variable link mechanism 200 comprises a two-armed Vee-shaped lever 202 which has one arm in rolling contact with the back face of an accelerator pedal 100, another arm pivoted to a bracket 204 via a shaft 206 and an elbowed corner portion engaged by a spring 208 which biases the Vee-shaped lever in a direction tending to provide a bias against the depression of the accelerator pedal 100. Pivoted to the elbowed corner portion of said Vee-shaped lever 202 is a push rod 210 at one end thereof whose other end portion passes through an operating lever 14a of the throttle valve 14 and carrys at its tip edge a stop 210a. The push rod 210 has a spring retainer 212 in the form of a diametrially enlarged section. A compression spring 214 is disposed between the spring retainer 212 and the operating lever 14a.

Figure 22A:
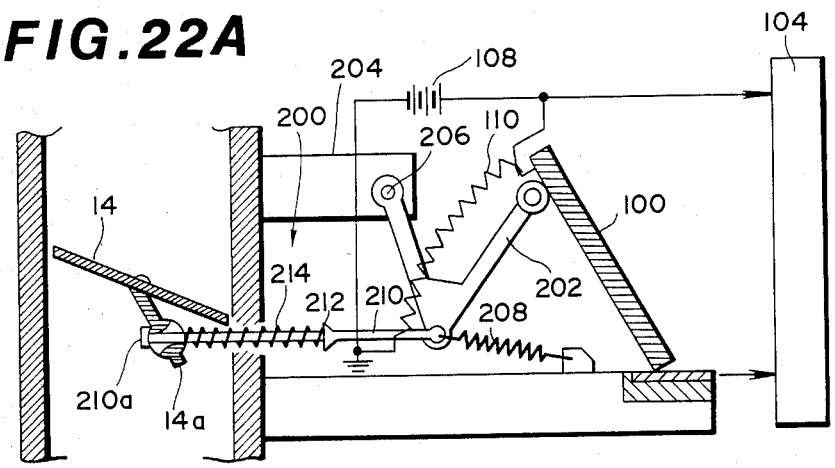
FIGS. 22A is a schematic sectional view of a throttle valve control mechanism when the accelerator pedal is released.
Figure 22B:
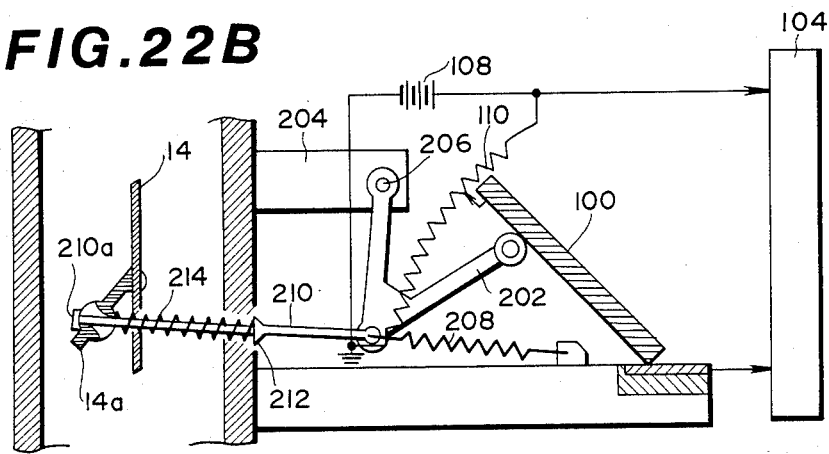
FIG. 22B shows the control mechanism when the accelerator pedal is depressed slightly.
Figure 22C:
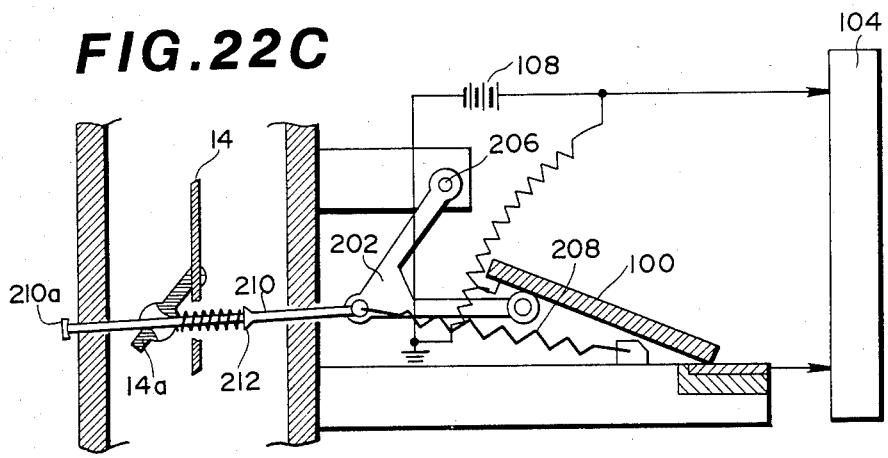
FIG. 22C shows the control mechanism when the accelerator pedal is depressed fully.

With this arrangement, if the driver depresses the accelerator pedal 100 from the position shown in FIG. 22(A) wherein the throttle valve 14 is in the fully closed position down to the position shown in FIG. 22(B), the Vee-shaped lever 202 is rotated counterclockwise viewing in the Figure against the tension of the spring 208 about the pivot 206 in accordance with the amount of depression of the accelerator pedal 100 and this rotation causes the push rod 210 to move leftwardly viewing in the Figure to rotate the throttle valve 14 via the compression spring 214. The degree of the opening of the throttle valve 14 in this case corresponds to the amount of depression of the accelerator pedal 100. The spring load of the compression spring 214 is set stronger than the spring load of the spring 208. The throttle valve 14 will not be opened beyond the fully open position. However, the accelerator pedal 100 may be depressed deeply and thus this further depression causes a counterclockwise rotation of the Vee-shaped lever 202 about the pivot 206, urging the push rod 210 to move leftwardly compressing the compression spring 214. Therefore, even if a further increase in degree of depression of the accelerator pedal 100 is detected by the variable resistor 6 to produce an increased opening degree indicative signal, the intake throttle valve 2 can stay in the fully open position. The other functions are the same as those of the preceding embodiments.

Accordingly, in this embodiment, with the variable link mechanism, the accelerator pedal cooperates with the opening degree of the intake throttle valve without using the electric actuator, thus providing a low cost, less complicated structure and permitting instantaneous transmission of a driver's effort.

In the previous embodiments, the present invention has been applied to the internal combustion engine which employs a system controlling the amount of induction air with a throttle valve mounted within an induction passage of the engine, viz., the amount of fuel supply is controlled by the induction throttle valve and a fuel injection. The invention, however, can be easily applied to a carburetor system where the amount of induction air and the amount of feeding of fuel are controlled by an intake throttle valve only, and, furthermore, in the case of a diesel engine where the amount of fuel injection of a fuel injection pump is controlled in cooperation with an accelerator pedal, the amount of fuel injection may be controlled in the place of the control of the opening degree of the induction throttle valve and the control of the injection amount of the fuel.

The selection of the operation line L is not confined to that shown in FIG. 9, and any desired operation line may, of course, be set which is fit for the type of the engine used and the other operation circumstances. The target values are not confined to engine output and engine RPM, and may be other variables as long as they are dependent upon engine output and engine RPM, such as torque, or a function of engine RPM and torque.

What is claimed is:

1. A control system for a motor vehicle having an accelerator pedal and an internal combustion engine having a throttle valve, said control system comprising:
   means for detecting a depression degree of the accelerator pedal and generating an accelerator position signal indicative of the detected depression degree of the accelerator pedal;
   means for detecting a vehicle speed of the motor vehicle and generating a vehicle speed signal indicative of the detected vehicle speed;
   means for detecting an engine speed of the engine and generating an actual engine speed signal indicative of the detected engine speed;
   means for adjusting an open position of the throttle valve in response to at least the detected depression degree of the accelerator pedal when the depression degree of the accelerator pedal is smaller than a predetermined depression degree, but keeping the throttle valve in a fully open position thereof irrespective of the depression degree of the accelerator pedal when the depression degree of the accelerator pedal is larger than a predetermined depression degree;
   means responsive to said accelerator depression degree signal and said vehicle speed signal for determining a target engine speed predetermined for the detected position of the accelerator pedal and the detected vehicle speed and generating a target engine speed signal indicative of the determined target engine speed;
   a continuously variable transmission operatively connected to the engine to be driven thereby; and
   means responsive to said target engine speed signal and said actual engine speed signal for adjusting a drive ratio of said continuously variable transmission.

2. A control system as claimed in claim 1, further comprising means for controlling the amount of fuel to be supplied to the engine and for providing a predetermined constant air-fuel ratio during operation of the engine between a first predetermined engine speed and a second predetermined engine speed which is higher than said first predetermined engine speed.

3. A control system as claimed in claim 2, wherein said predetermined air fuel ratio is set lean.

4. A control system as claimed in claim 2, wherein said means for adjusting the open position of the throttle valve includes an electric motor operatively connected to the throttle valve.

5. A control system as claimed in claim 2, wherein said means for adjusting the open position of the throttle valve includes a variable link mechanism operatively disposed between the accelerator pedal and the throttle valve, the variable link mechanism being constructed and arranged such that the position of the throttle valve is dependent upon the depression degree of the accelerator pedal when the depression degree of the accelerator pedal is smaller than a predetermined depression degree, but the position of the throttle valve remains in the fully open position irrespective of the depression degree of the accelerator pedal when the depression degree of the accelerator pedal is larger than said predetermined depression degree.

6. A control system for a motor vehicle having an accelerator pedal and an internal combustion engine having a throttle valve, said control system comprising:
   means for generating an accelerator depression degree signal indicative of a depression degree of the accelerator pedal;
   means for generating a vehicle speed signal indicative of a vehicle speed of the motor vehicle;
   means for storing an operation line containing operation data for the engine;
   means, coupled with said accelerator depression degree signal generating means and with said vehicle speed generating means, for generating a target signal in response to said accelerator depression degree signal and said vehicle speed signal, said target signal being indicative of one operation datum of said operation data;
   a continuously variable transmission operatively connected to the engine to be driven thereby;
   means, responsive to said target signal, for operating said continuously variable transmission to continuously vary a drive ratio; and
   means for controlling the amount of fuel to be supplied to the engine,
   said operating means and said controlling means functioning in such a manner as to cause the engine to operate in accordance with said operation datum indicated by said target signal,
   said means for controlling the amount of fuel including a variable link mechanism operatively disposed between the accelerator and the throttle valve,
   said variable link mechanism being constructed and arranged such that the position of the throttle valve is dependent upon the depression degree of the accelerator pedal when the depression degree of the accelerator pedal is smaller than a predetermined depression degree, but the position of the throttle valve remains in a fully open position thereof irrespective of the depression degree of the accelerator pedal when the depression degree of the accelerator pedal is larger than said predetermined depression degree.

7. A control system for a motor vehicle having an accelerator pedal, an internal combustion engine having a throttle valve, a clutch, and a continuously variable transmission having a drive shaft selectably connectable to the engine and a driven shaft connected to at least one road wheel, the continuously variable transmission having a V-belt running over a drive pulley on the drive shaft and a driven pulley on the driven shaft, wherein a ratio between the pulleys is controlled by a shift motor, the control system comprising:

means for detecting a depression degree of the accelerator pedal and generating an accelerator depression degree signal indicative of the detected depression degree of the accelerator pedal;

means for detecting a vehicle speed of the motor vehicle and generating a vehicle speed signal indicative of the detected vehicle speed;

means for detecting an engine speed of the engine and generating an actual engine speed signal indicative of the detected engine speed;

means for adjusting an open position of the throttle valve in response to at least the detected depression degree of the accelerator pedal when the depression degree of the accelerator pedal is smaller than a predetermined depression degree, but keeping the throttle valve in a fully open position thereof irrespective of the depression degree of the accelerator pedal when the depression degree of the accelerator pedal is larger than a predetermined depression degree;

means, responsive to said accelerator depression degree signal and said vehicle speed signal, for determining a target engine speed predetermined for the detected depression degree of the accelerator pedal and the detected vehicle speed and generating a target engine speed signal indicative of the determined target engine speed;

means, responsive to said target engine speed signal and said actual engine speed signal, for adjusting a drive ratio of said continuously variable transmission to decrease a difference between said target engine speed signal and said actual engine speed signal; and means for controlling the amount of fuel to be supplied to the engine in such a manner as to provide a predetermined constant air-fuel ratio during operation of the engine between a first predetermined engine speed and a second predetermined engine speed which is higher than said first predetermined engine speed.

8. A control system as claimed in claim 7, wherein said means for adjusting the open position of the throttle valve is responsive to a target power output of the engine which is a function of the detected depression degree of the accelerator pedal and the detected engine speed.

9. A control system as claimed in claim 8, wherein said means for adjusting the open position of the throttle valve includes an electric motor operatively connected to the throttle valve.

10. A control system as claimed in claim 7, wherein said means for adjusting the open position of the throttle valve includes a variable link mechanism operatively disposed between the accelerator pedal and the throttle valve.

11. A control system as claimed in claim 10, wherein said variable link mechanism comprises:

an operating lever connected to the throttle valve for adjusting the position of the throttle valve;

a two-armed member having a first arm and a second arm extending from a corner portion, the member being pivotably mounted to a stationary portion at the first arm thereof, said second arm being in rolling contact with the accelerator pedal to be pivotable in a first rotational direction as the accelerator pedal is depressed;

a push rod having one end linked to the corner portion of said two-armed member and another end linked to said throttle operating lever said operating lever slidably receiving said push rod;

return spring means for biasing said two-armed member in a second rotational direction opposite to the first rotational direction and in turn biasing the accelerator pedal toward a released position thereof;

a motion-transmitting spring operatively disposed between said operating lever and said push rod; and a stop on said another end of said push rod for preventing disengagement of said push rod from said operating lever;

said motion-transmitting spring and said stop cooperating with said operating lever to provide an arrangement wherein the position of the throttle valve is dependent upon the depression degree of the accelerator pedal when the depression degree of the accelerator pedal is smaller than a predetermined depression degree, but the position of the throttle valve remains in a fully open position thereof irrespective of the depression degree of the accelerator pedal when the depression degree of the accelerator pedal is larger than said predetermined depression degree.

* * * * *